Dec. 27, 1938.   C. H. ARNOLD   2,141,332
CASH REGISTER
Filed June 16, 1934   17 Sheets-Sheet 1

Inventor
Charles H. Arnold
By
Carl Benst
His Attorney

Dec. 27, 1938.  C. H. ARNOLD  2,141,332
CASH REGISTER
Filed June 16, 1934  17 Sheets-Sheet 4

Inventor
Charles H. Arnold
By
Earl Benst
His Attorney

Dec. 27, 1938.　　　　C. H. ARNOLD　　　　2,141,332
CASH REGISTER
Filed June 16, 1934　　　17 Sheets-Sheet 5
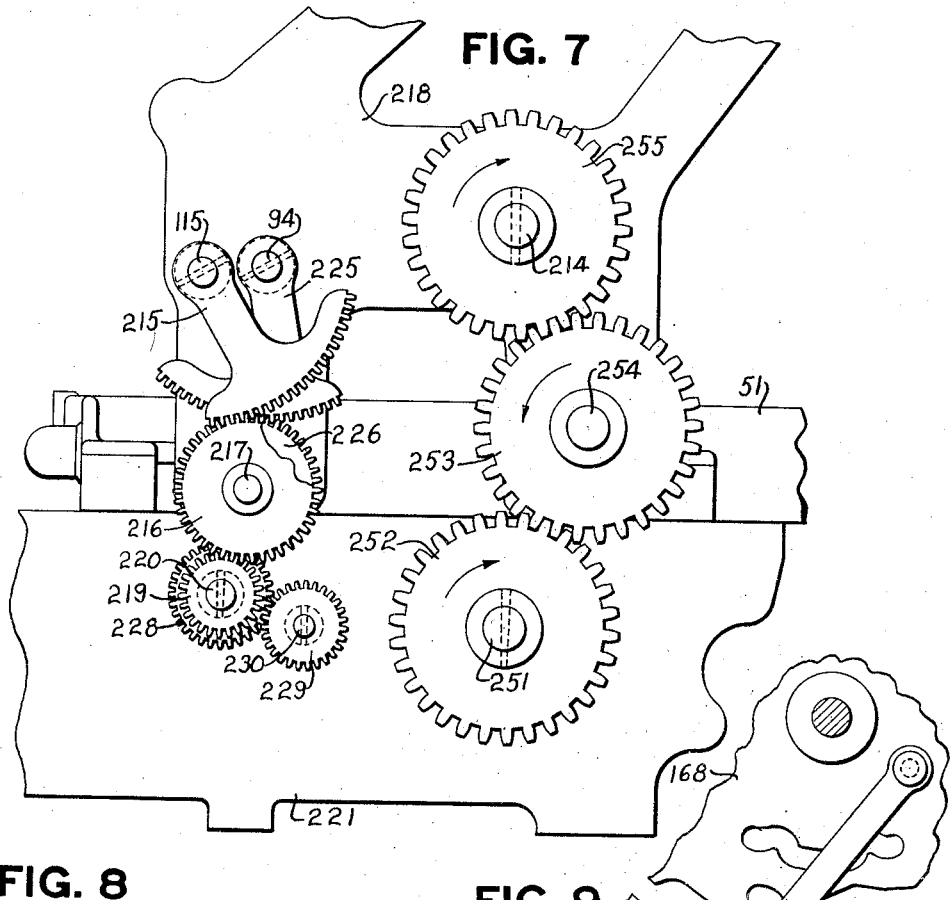
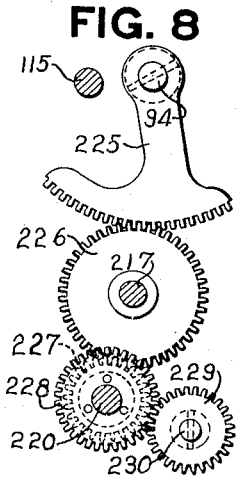
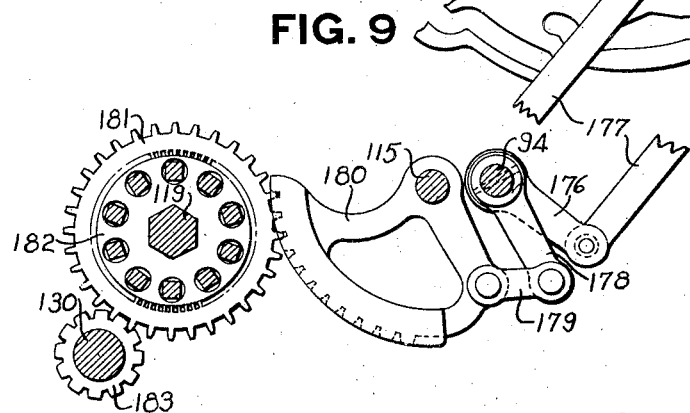
Inventor
Charles H. Arnold
By
Carl Benst
His Attorney Dec. 27, 1938.   C. H. ARNOLD   2,141,332
CASH REGISTER
Filed June 16, 1934   17 Sheets-Sheet 6

Inventor
Charles H. Arnold
By
Carl Berit
His Attorney

Dec. 27, 1938.  C. H. ARNOLD  2,141,332
CASH REGISTER
Filed June 16, 1934   17 Sheets-Sheet 7

Inventor
Charles H. Arnold
By
Earl Beust
His Attorney

THIS GROUP PRINTS ON STATEMENT SLIP

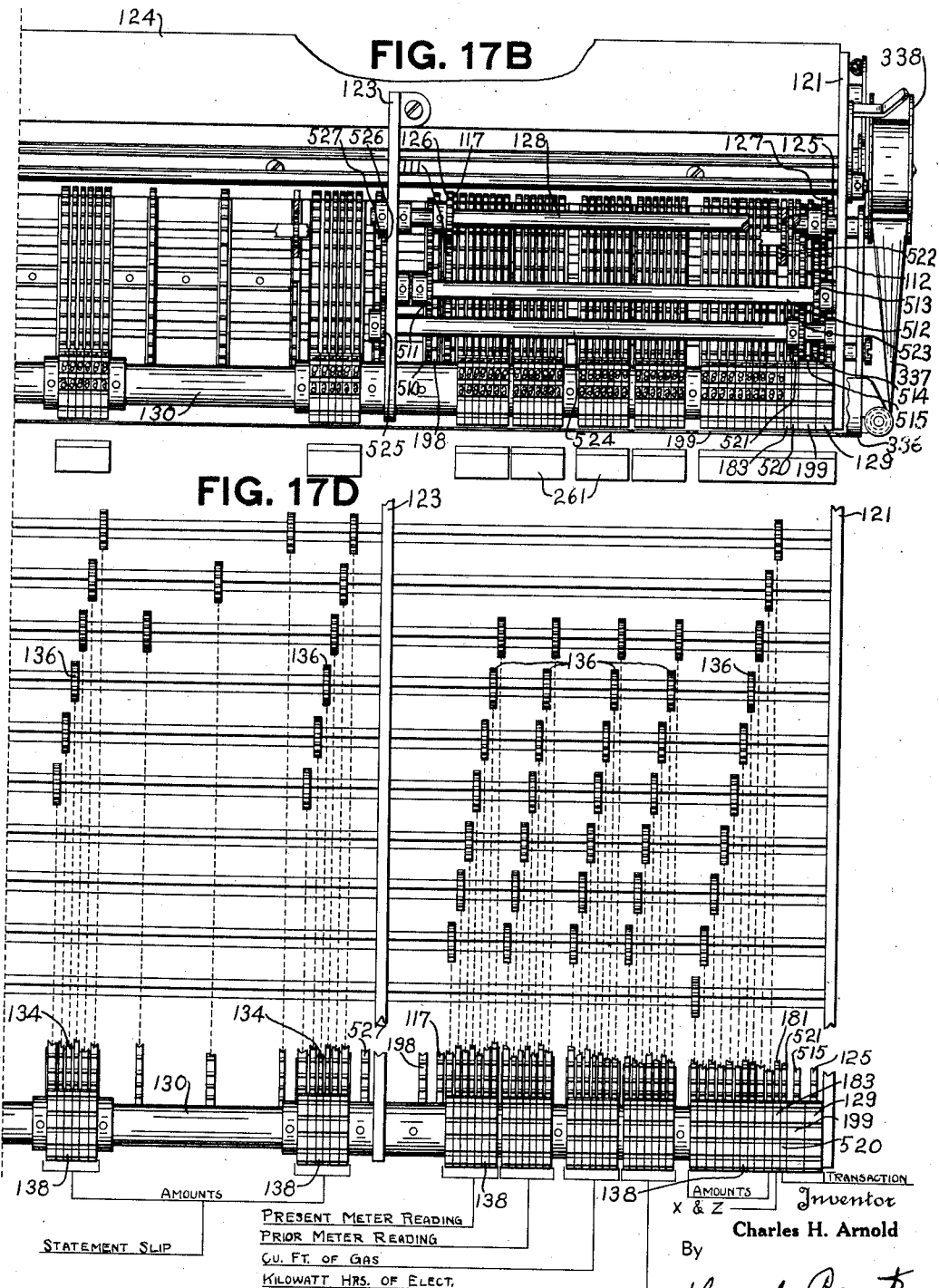

Dec. 27, 1938.  C. H. ARNOLD  2,141,332

CASH REGISTER

Filed June 16, 1934  17 Sheets-Sheet 10

Inventor
Charles H. Arnold
By
Carl Benst
His Attorney

Dec. 27, 1938.    C. H. ARNOLD    2,141,332
CASH REGISTER
Filed June 16, 1934    17 Sheets-Sheet 12

Inventor
Charles H. Arnold
By
Earl Benst
His Attorney

Dec. 27, 1938.   C. H. ARNOLD   2,141,332
CASH REGISTER
Filed June 16, 1934   17 Sheets-Sheet 13
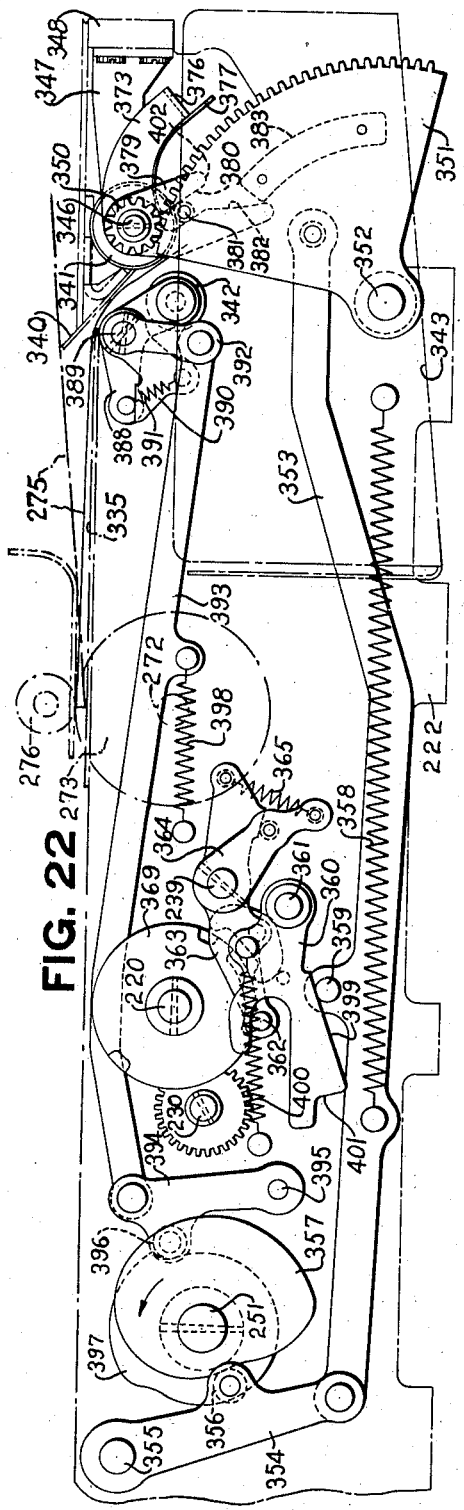
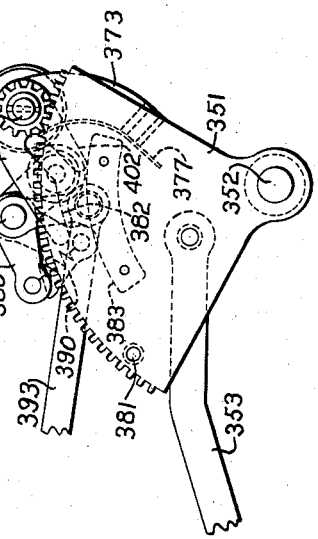
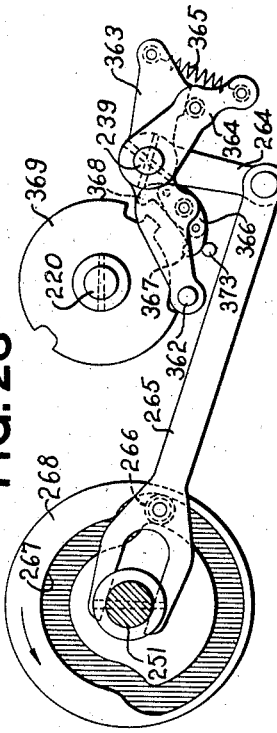
Inventor
Charles H. Arnold
By
Carl Bent
His Attorney Dec. 27, 1938.   C. H. ARNOLD   2,141,332
CASH REGISTER
Filed June 16, 1934   17 Sheets-Sheet 14

Inventor
Charles H. Arnold
By
Earl Beust
His Attorney

Dec. 27, 1938.   C. H. ARNOLD   2,141,332
CASH REGISTER
Filed June 16, 1934   17 Sheets—Sheet 15
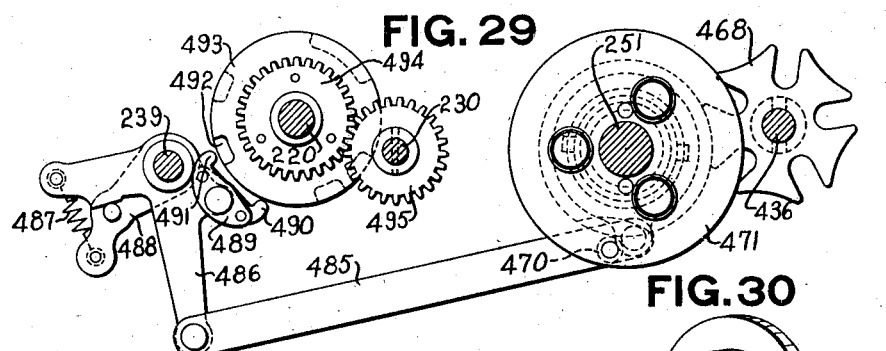
FIG. 29
FIG. 30
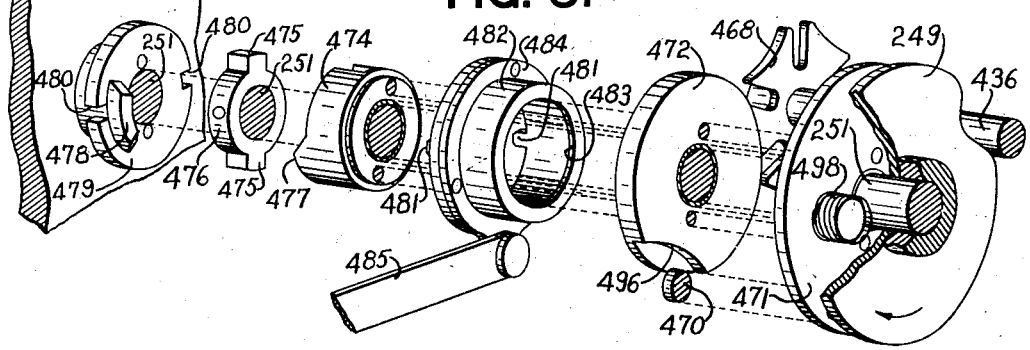
FIG. 31
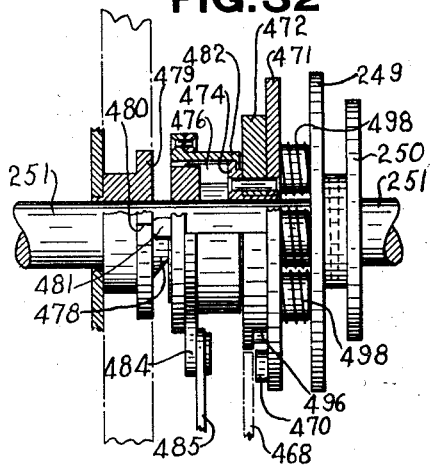
FIG. 32
Inventor
Charles H. Arnold
By
Yearl Beust
His Attorney Dec. 27, 1938.   C. H. ARNOLD   2,141,332
CASH REGISTER
Filed June 16, 1934   17 Sheets-Sheet 16

FIG. 33

BOOKKEEPING COUPON | BILL | RETURN STUB | COLLECTORS COUPON

To ANY ELECTRIC AND GAS CO.
123 BLANK Street, Blank, Ohio.

SERVICE FROM DEC. 22 TO JAN. 22

JOHN DOE
456 EASY ST.

| METER READINGS | | Hundred Cu. Feet Gas | Kilowatt Hr. Elec. | AMOUNT OF BILL |
|---|---|---|---|---|
| PRESENT | PRIOR | | | |
| 32172 | 32092 | | 80 | 6.30 |
| 67963 | 67933 | 30 | | 3.60 |
| | | | | 9.90 |

FIG. 34   403

| | | | |
|---|---|---|---|
| 32172 | 32092 | | 80 | 6.30 |
| 67963 | 67933 | 30 | | 3.60 |
| | | | | 9.90 |
| 71926 | 71826 | | 100 | 7.70 |
| 32577 | 32487 | 90 | | 10.80 |
| | | | | 18.50 |
| | | | 1600 | 114.50 E |
| | | | | 155.10 G |

Inventor
Charles H. Arnold
By
Carl Benst
His Attorney

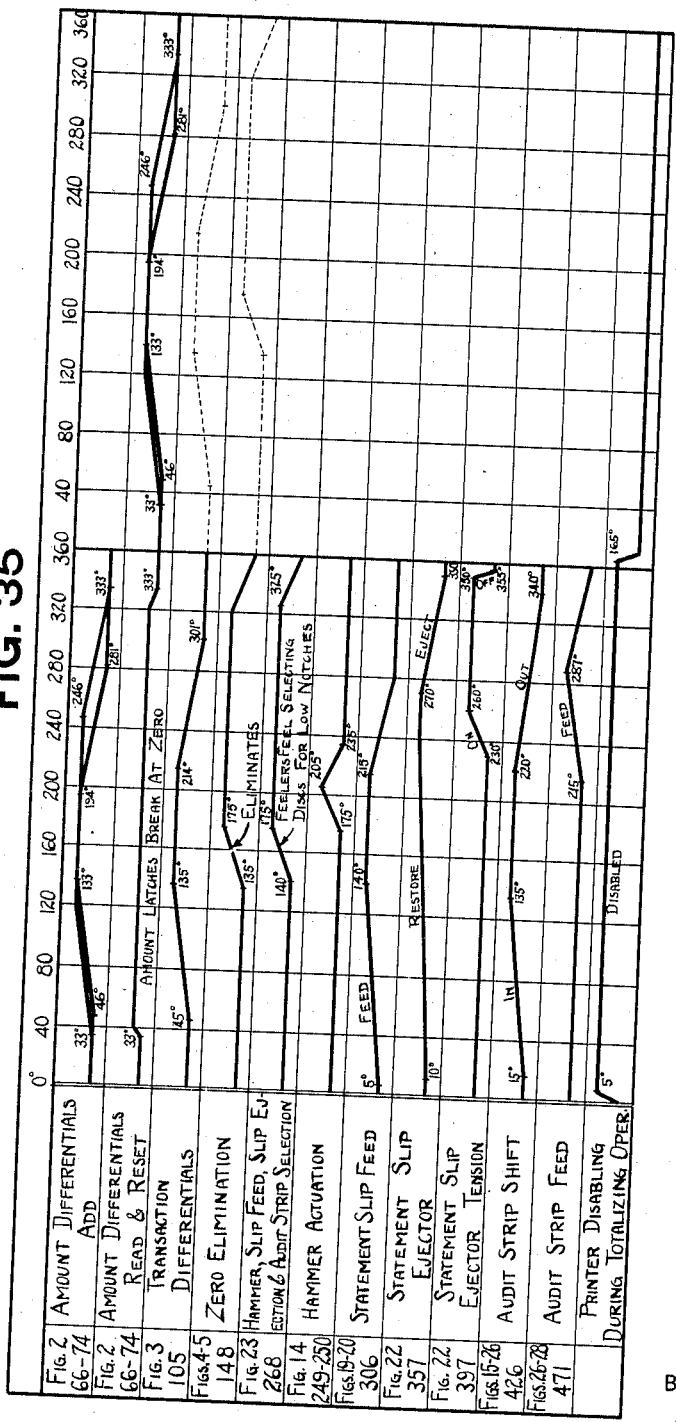

Patented Dec. 27, 1938

2,141,332

UNITED STATES PATENT OFFICE 2,141,332

CASH REGISTER

Charles H. Arnold, Dayton, Ohio, assignor to The National Cash Register Company, Dayton, Ohio, a corporation of Maryland Application June 16, 1934, Serial No. 730,880

43 Claims. (Cl. 197—127)

This invention relates to improvements in cash registers of the type illustrated and described in Letters Patent of the United States Nos. 1,619,796, 1,747,397 and 1,761,542, issued respectively March 1, 1927, February 18, 1930 and June 3, 1930, to B. M. Shipley and the copending application of M. M. Goldberg filed August 27, 1931, Serial Number 559,720.

It is generally the custom for public utilities companies that supply communities with electric current, and gas, to furnish their numerous subscribers with a periodical statement of their accounts. These statements are, as a general rule composed of various detachable bills, coupons and stubs; for example, a bookkeeping coupon, a subscriber's bill and coupon, and a collector's coupon. Upon each of these coupons, stubs and bills various data and amounts are duplicated, and to this end a cash register of the type which simultaneously prints in a plurality of columns otherwise known as a column printing register is admirably adapted.

Therefore it is broadly an object of this invention to provide a cash register to simultaneously print various data and amounts in the several columns on record material.

A more specific object is to construct a cash register which duplicates the printing of various data and amounts in the several columns on record material during one machine operation.

Another object is to provide novel means to position certain of the type wheels independently of the differential mechanism.

A further object is to provide means to move the higher denomination amount type wheels to a non-printing position when no keys are depressed in the higher denomination amount banks.

Still another object is to provide the machine of this invention with an improved impression mechanism.

Another object is to provide novel feeding mechanism to present the statment slip to the printing mechanism, to line-space the slip after it is presented to the printing mechanism and finally to return the slip to the ejecting mechanism.

A further object is to supply a novel device to eject the statement slips, invert them during ejection, and deposit them in sequential order in a suitable receptacle.

Still another object is to provide novel means for feeding the audit strip.

A further object is to furnish a novel selective mechanism controlled by the transaction keys and the total keys for controlling the statement slip feeding and ejecting mechanisms, the audit strip feeding mechanism and the impression mechanism.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 7 is a side elevation showing the mechanism for operating the printer and the selective controlling means therefor.

Fig. 8 is a detail view of part of the mechanism illustrated in Fig. 7.

Fig. 9 is a detail view of a part of the mechanism for transmitting differential movement of the total control plate to the read and reset type wheel.

Figure 17A:
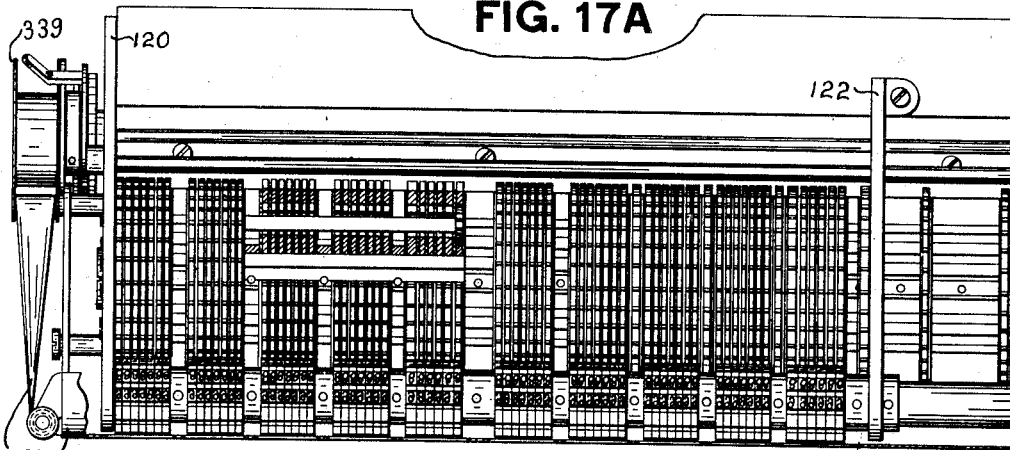

Figs. 17A and B combined constitute a front view of the printing mechanism.

Figure 17C:
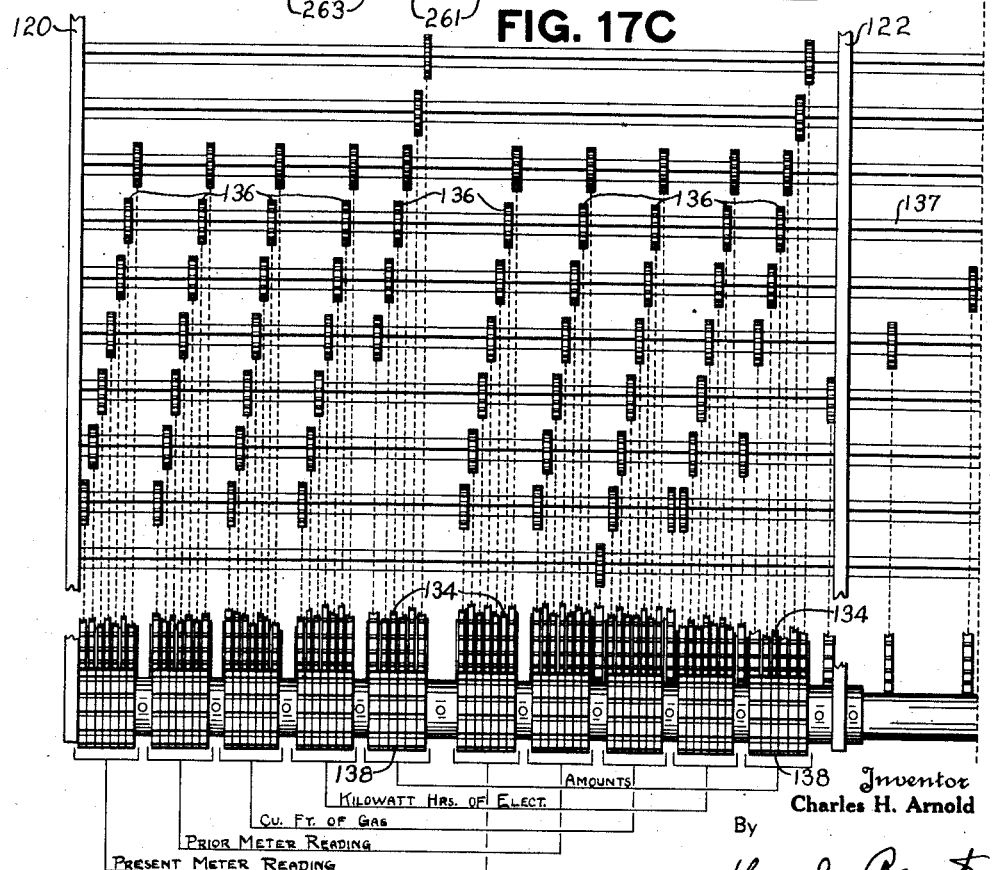

Figs. 17C and D combine to form a diagrammatic view of the type wheel driving lines.

Figure 18A:
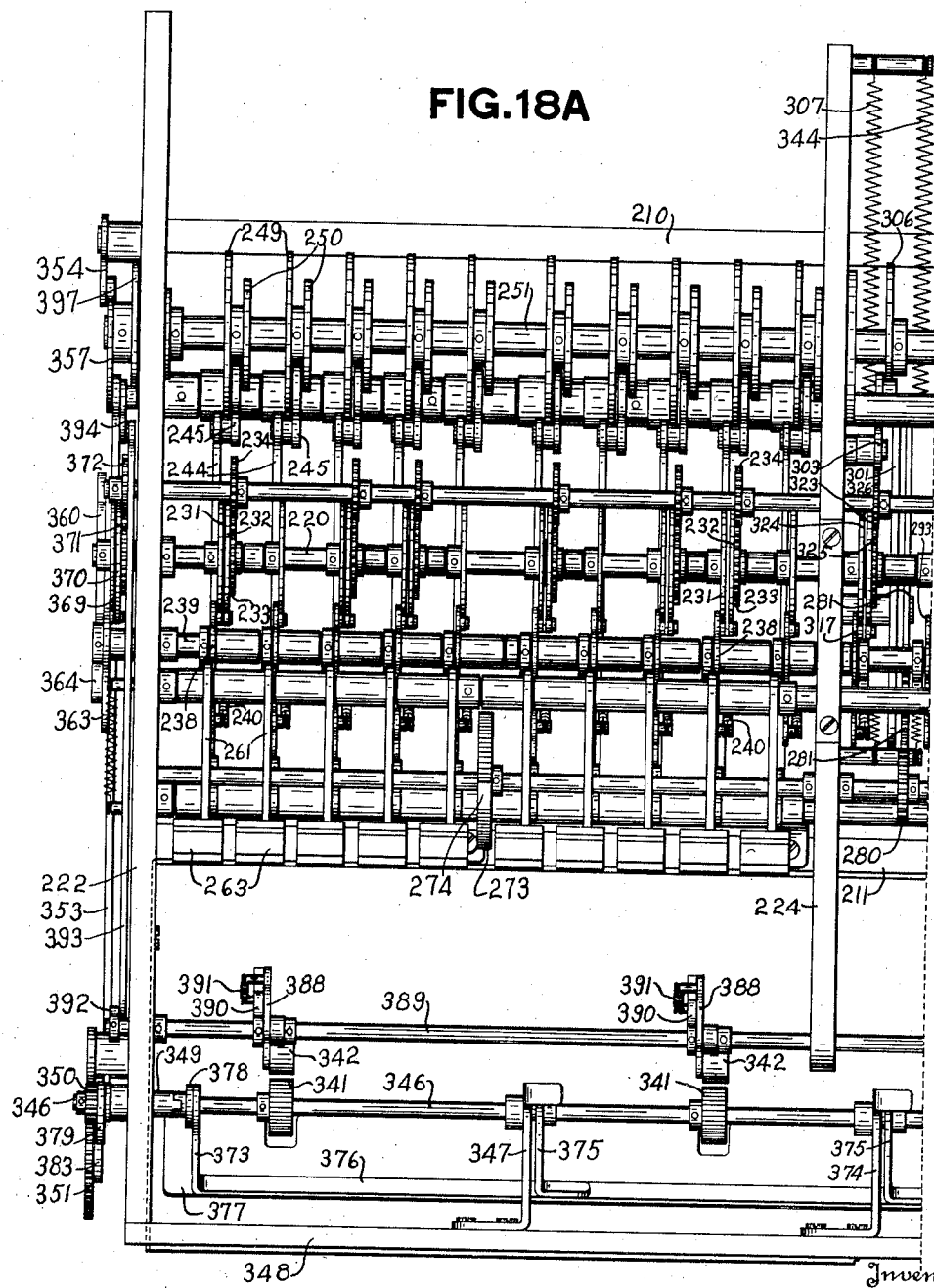

Figs. 18A and B combined constitute a top plan view of the printer impression and selective controlling mechanism, the slip feeding and ejecting mechanism, and the audit strip feeding mechanism.

Figure 19:
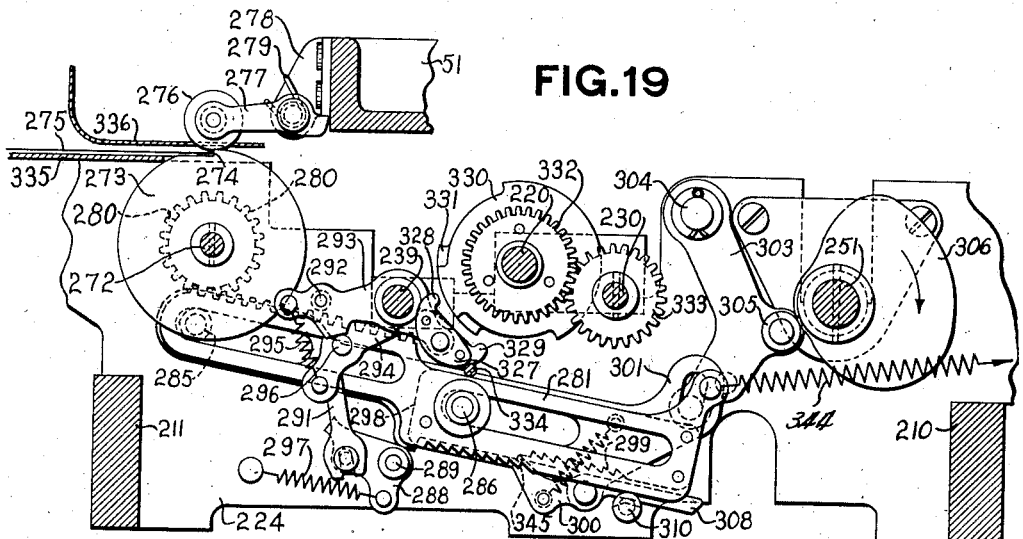

Fig. 19 is a side elevation as observed from the right of the machine showing the statement slip feeding mechanism.

Figure 20:
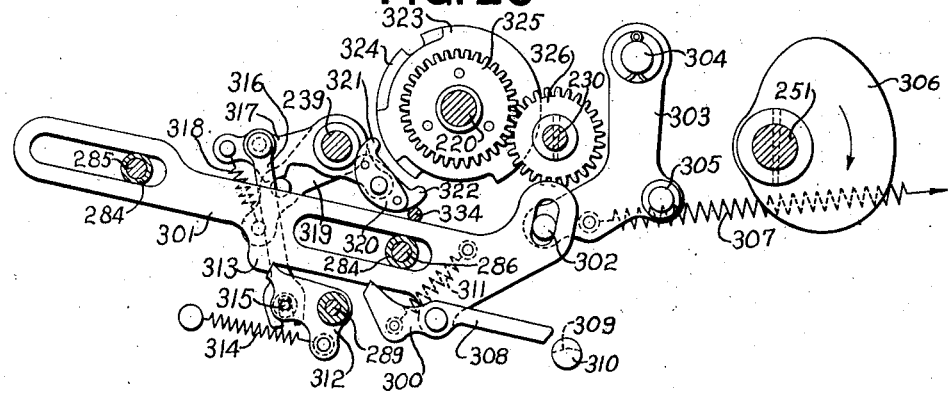

Fig. 20 is a side view of the mechanism for operating the statement slip feeding mechanism.

Figure 21:
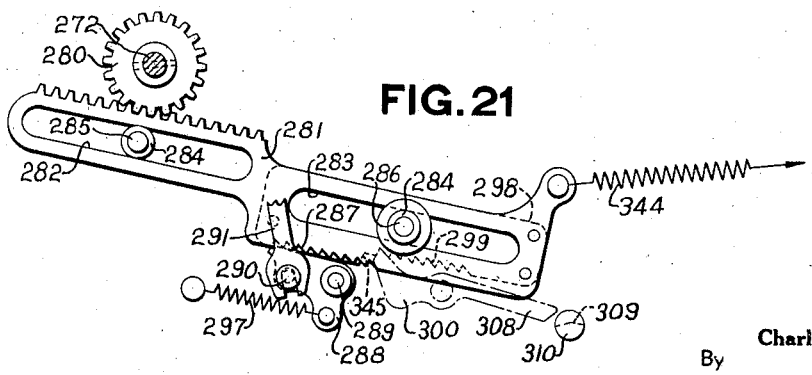

Fig. 21 is a detail view of the statement slip feeding rack and associated mechanism.

Fig. 22 is a side elevation as observed from the left of the machine showing the statement slip ejecting mechanism.

Fig. 23 is a detail view of the mechanism for selectively controlling the statement slip ejecting mechanism.

Fig. 24 is a detail view of a portion of the statement slip ejecting mechanism.

Fig. 25 is a detail view of one of the selecting plates and its feeler for the statement slip ejecting mechanism.

Fig. 26 is a side elevation as observed from the right of the machine showing in general the audit strip feeding mechanism.

Fig. 27 is a fragmentary sectional view of the audit strip receiving roll.

Fig. 28 is a side view illustrating the audit strip feeding mechanism.

Fig. 29 is a detail view of the mechanism for selectively enabling or disabling the audit strip feeding mechanism.

Fig. 30 is a detail view in perspective of the Geneva gear drive plate.

Fig. 31 is a disassembled view in perspective of the audit strip feeding and controlling mechanism.

Fig. 32 is a front assembled view, partly sectioned, of the mechanism shown in Fig. 31.

Fig. 33 is a facsimile of a statement slip used in the machine of the instant invention.

Fig. 34 is a facsimile of a fragment of an audit strip used in the machine of the instant invention.

Fig. 35 is a chart giving the time of operation of the mechanism pertinent to the instant invention.

General description

In its present embodiment the machine embracing the instant invention is arranged for use by public utilities companies that supply electrical current and gas to a plurality of consumers. However, it is not intended to limit this machine to any one system or use, as with slight alteration it may be adapted for use in many other ways, all coming within the scope of this invention.

Described in general terms the instant invention is embodied in the well-known type of cash register illustrated and described in the patents and application referred to at the beginning of this specification. This machine is equipped with a column type printer located at the front of the machine, said printer being arranged to print in duplicate various amounts and data in the various columns of an insertable slip during one machine operation. In addition, a record of each transaction is printed in columnar alignment on an audit strip located at the right of the machine.

After being properly inserted in the machine, the statement slip is automatically fed rearwardly to printing position and if entries are to be made in more than one line, depressing the proper control key causes the statement slip to be automatically line-spaced after the proper entries have been made on one line. In the final operation, depressing a control key causes the slip feeding mechanism to return the slip forwardly into position to be engaged by the slip ejecting mechanism which ejects the slip toward the front of the machine. In the process of ejection, the slip is inverted or turned face downwardly and deposited in a suitable receptacle located at the front of the machine. Turning the slips face downwardly causes them to be stacked in the receptacle in proper sequential order. If printing is to take place only on one line of the slip, depressing the proper control key causes the slip feeding mechanism to return the slip forwardly to the ejecting mechanism immediately after the last entry is made on the one line.

It will be understood that all the entries on a single line are not necessarily made during one machine operation but may be the result of several machine operations. However, the slip may be line-spaced or returned to the ejecting mechanism as desired in the last of a series of operations by depressing the proper control key.

Selecting mechanism, controlled by the transaction keys and total control keys and automatically controlled in certain instances, governs the functioning of the printing hammers to cause printing in the proper columns, and likewise controls the slip feeding and ejecting mechanism as well as the audit strip feeding mechanism.

All the mechanism pertinent to the instant invention will now be described in detail.

Detailed description

The instant invention is embodied in the type of register illustrated and described in the patents referred to at the beginning of this specification. As machines of this character are well known in the art the mechanism thereof having no direct bearing on the instant invention, will be but briefly described.

Machine framework and operating mechanism

Figure 2:
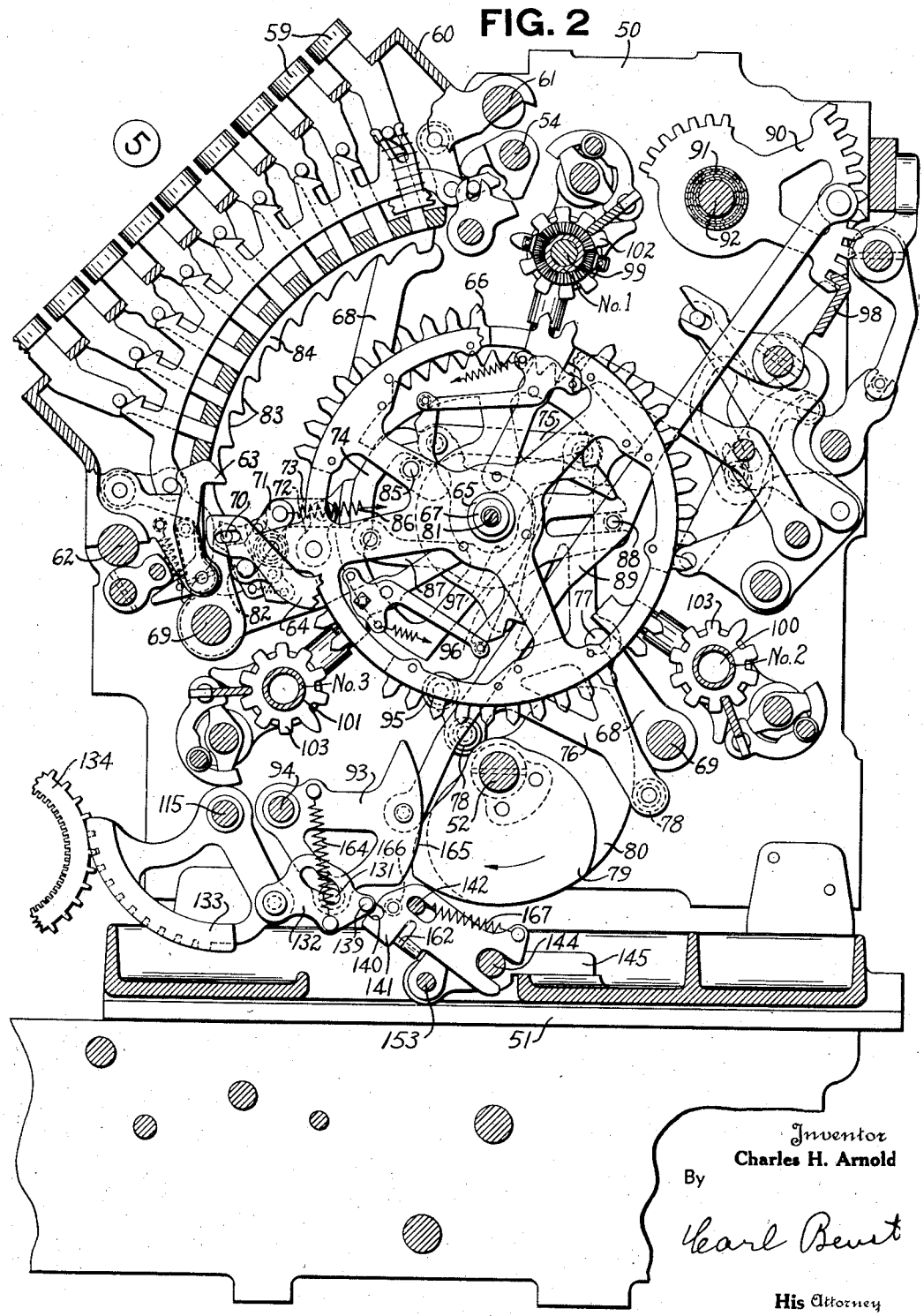
Fig. 2 is a sectional view showing in particular an amount bank and its associated differential mechanism.
Figure 3:
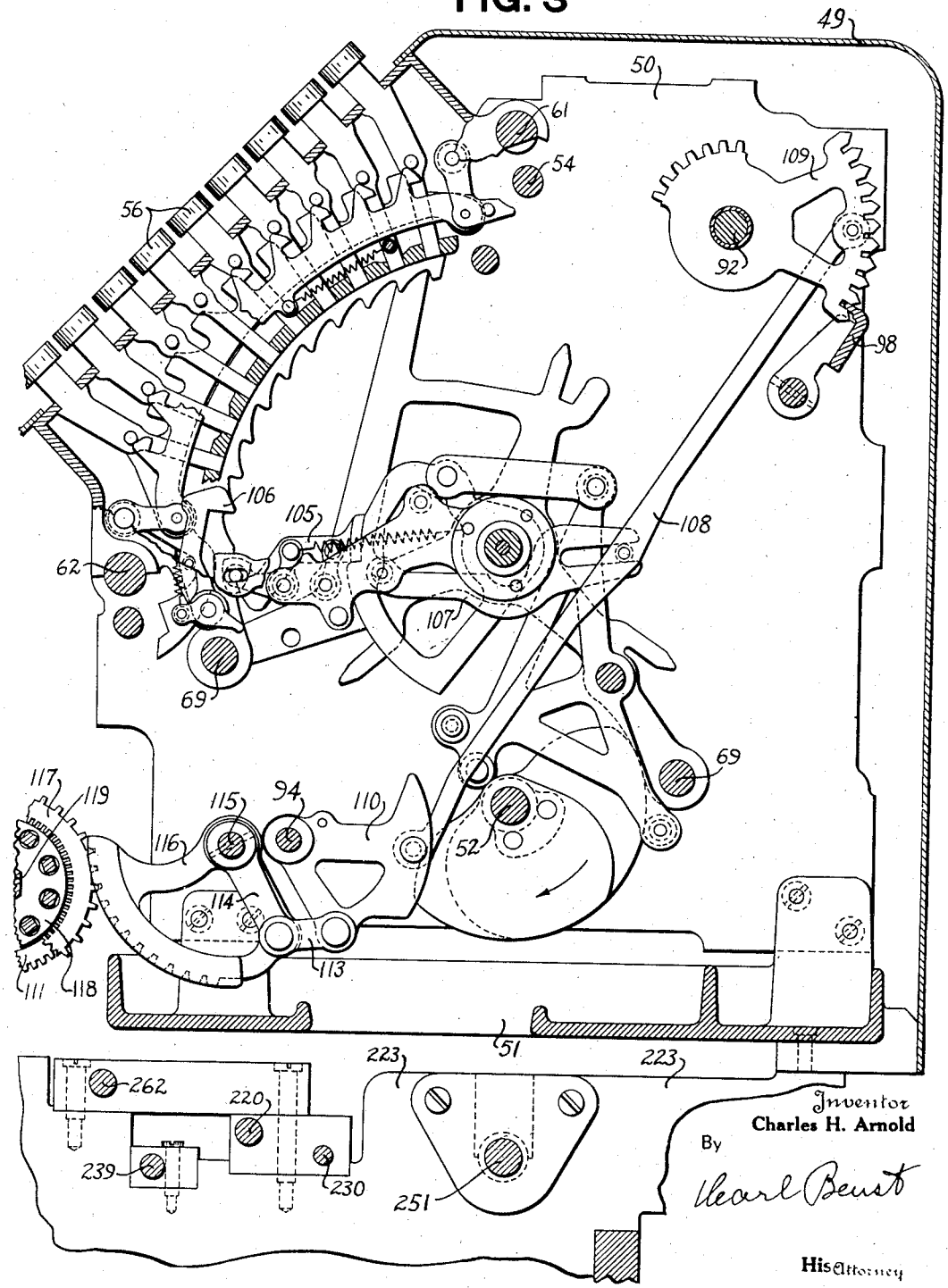
Fig. 3 is a sectional view showing a transaction bank and its associated differential mechanism.

Calling attention to Figs. 2 and 3, the mechanism of the machine proper is supported by two main frames 50, only one (the left frame) being here shown, and various other intermediate frames, cross frames and braces. The main frames are in turn secured to a machine base 51 and the entire machine is enclosed in a suitable cabinet 49 also secured to the machine base 51.

As a general rule the machine is operated by means of the usual electric motor (not shown) which is operatively connected to the main drive shaft 52 by the usual clutch mechanism and gearing.

Depressing the usual motor bar 53 (Fig. 1) releases a key lock shaft 54 (Fig. 2) for a slight clockwise movement under influence of a spring. This movement of the shaft 54 engages the clutch mechanism and closes the electrical circuit to the motor thereby causing the machine to operate. Near the end of machine operation the shaft 54 is rocked counterclockwise to release the depressed keys, disengage the clutch mechanism and simultaneously open the motor switch in the usual manner.

If desired, or when electrical current is not available the machine may be operated by means of a hand crank which is operatively connected to the main drive shaft 52 by means of a train of gears. Depressing the starting bar 53 (Fig. 1) releases the shaft 52 for rotation, as explained hereinbefore. The machine may then be operated by turning the hand crank.

As the motor, clutch and releasing mechanism are of conventional design and old in the art they have not been illustrated herein and will not be further described. However, reference may be had to the Shipley Patent No. 1,761,542 issued June 3, 1930, for a full disclosure of this operating mechanism.

Keyboard

Figure 1:
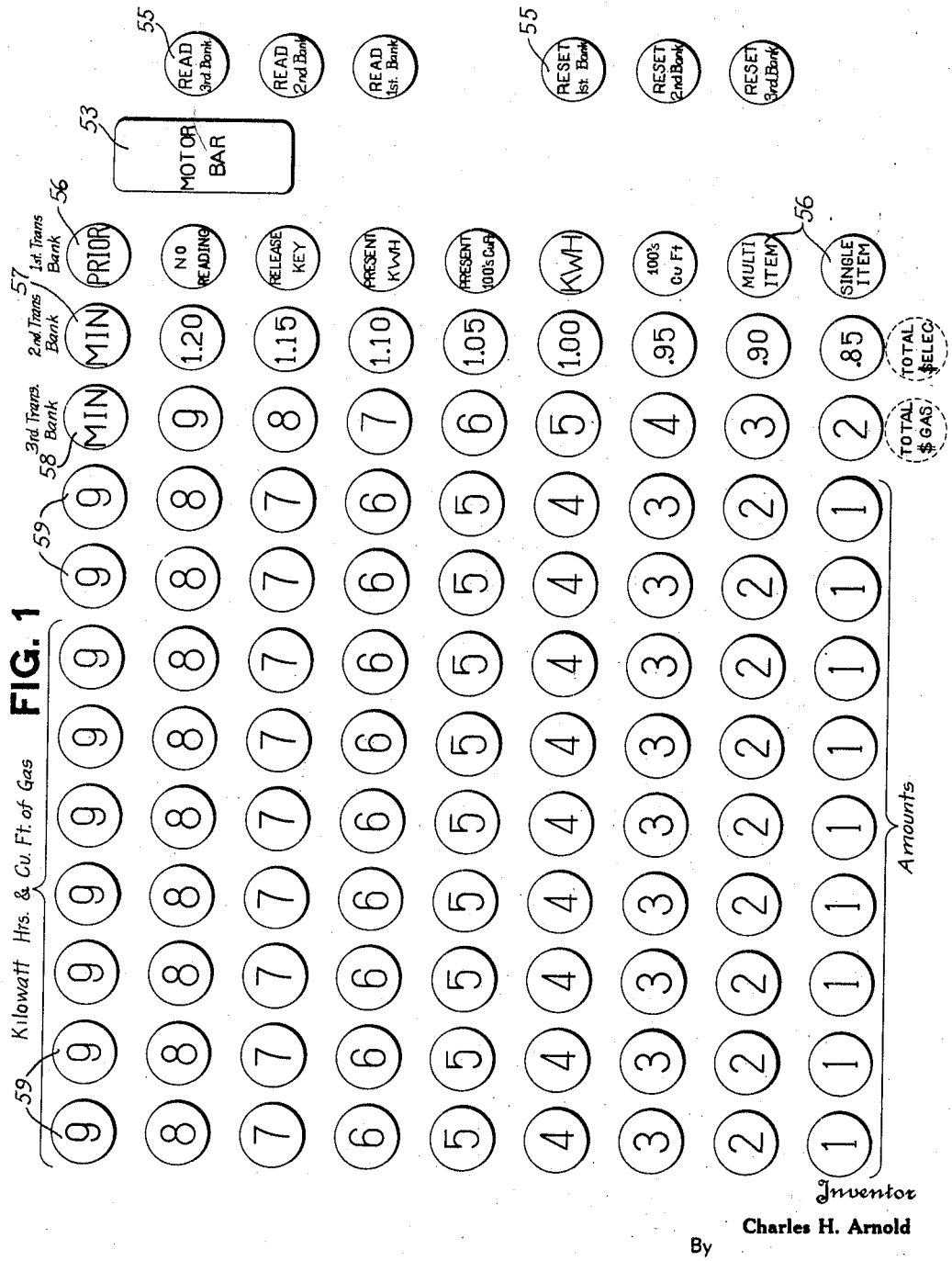
Fig. 1 is a diagrammatic view of the keyboard of the machine of the instant invention.

Fig. 1 is a diagrammatic view of a typical keyboard arrangement for use by public utilities companies.

Located at the extreme right of the keyboard is a series of total control keys 55 that control the reading and resetting of the different totalizers. Next in order is the motor bar 53 which as previously stated, controls the operation of the machine. Next are three rows of transaction keys 56, 57 and 58, which select the different totalizers for engagement with their actuators in a manner later to be described. As presently constructed the machine of this invention has nine rows of amount keys 59, which position the differential actuators in the well known manner.

Amount keys and differential mechanism

As previously stated, the machine of this invention has nine banks 60 of amount keys 59, and as all the amount banks and their associated differential mechanisms are similar it is thought that the description of one denominational unit will be sufficient for the purpose of this invention. To ascertain the timing of the differential mechanism reference may be had to Fig. 35.

Referring to Fig. 2 the amount key banks 60 are removably supported on rods 61 and 62 extending between and supported by the main machine frames 50. Pivoted on the lower end of each amount bank is a zero stop lever 63 having a right-angled projection arranged to cooperate with the forward end of a reset spider 64 pivoted on a hub 65 of an amount differential actuator 66. The actuator 66 is loosely mounted on a hub 67 extending between two differential support plates 68 (only one here shown) supported by a pair of rods 69 extending between the main frames 50. The spider 64 has in its forward end a slot through which extends a stud 70 in a differential latch arm 71 pivoted to the actuator 66.

Mounted for lateral shifting movement by means of the arm 71 and a similar arm 72 is a differential latch 73, a foot-shaped projection of which is arranged to cooperate with a differential driving segment 74 pivoted on the hub 67, and connected by a link 75 to a lever 76 journaled on a stud 77 secured in one of the plates 68. The lever 76 carries a pair of rollers 78 which cooperate with the peripheries of companion cams 79 and 80 secured on the main drive shaft 52.

In adding operations the shaft 52 and the cams 79 and 80 make one complete revolution clockwise, which by means of the lever 76 and the link 75 rocks the driving segment 74 first in a clockwise direction and then back to normal position.

As previously stated, there is a differential actuator unit like that explained above, for each amount bank and each differential unit is supported between two of the plates 68. The complete assembly of differential units are held together by means of a rod 81 extending through the hubs 67.

If no key is depressed in an amount bank, the zero stop lever 63 engages the forward end of the reset spider 64 to rock the latch arm 71 counterclockwise to move the differential latch 73 forwardly thereby disengaging the foot thereof from the depression in the driving segment 74 and engaging a nose 82 of said latch with one of a series of notches 83 in a plate 84 secured to one of the plates 68. This stops the differential actuator 66 in zero position by disengaging said latch from the driving segment 74.

The concentric portion of the segment 74 in cooperation with the foot of the latch 82 maintains the nose of said latch in engagement with the plate 84 while said segment completes its initial movement clockwise and during the greater part of the return movement of said segment until the depression therein is opposite the foot of the latch 82. When the depression is opposite the foot of the latch 82 a flat surface of the segment 74 engages a stud 85 in the actuator 66 and returns said actuator to home position, thereby disengaging the reset spider 64 from the zero stop lever 63 and allowing a spring 86 to disengage the nose 82 of the latch 73 from the notch in the plate 84 and to reengage the foot of said latch with the depression in the driving segment 74.

Depressing one of the amount keys 59 forces the lower end of the stem thereof into the path of the latch arm 71. Consequently, initial movement clockwise of the segment 74 and the actuator 66 causes said arm 71 to engage the stem of said key to disengage the foot of the latch 73 from the segment 74 in exactly the same manner as explained above. On its return movement the segment 74 engages the stud 85 to return the actuator 66 and disengage the latch 73, as described above.

It will be also understood that depression of an amount key 59 rocks the zero stop lever 63 counterclockwise out of the path of the spider 64, thereby allowing the actuator 66 to travel clockwise until stopped by the depressed amount key.

The differential positioning of the actuator 66 is transmitted to the indicator and printing mechanisms by means of a beam 87 pivoted on said actuator 66 and bifurcated to embrace a stud 88 in a link 89, the upper end of which is pivoted to an indicator segment 90 supported by one of a series of indicator tubes 91 on an indicator shaft 92 opposite ends of which are supported by the main frame 50. The lower end of the link 89 is pivoted to a printer segment 93 turnably supported on a rod 94 opposite ends of which are carried by the main frames 50.

After the actuator 66 has been positioned by a depressed amount key, as explained earlier herein or by the totalizer wheel in total taking operations, in a manner later to be described, a roller 95 carried by the lever 76 engages an arcuate surface 96 of the beam 87 to force an arcuate surface 97 of said beam into contact with the hub 65. This by means of the link 89 positions the segments 90 and 93 commensurate with the position of the actuator 66. The segments 90 and 93 in turn position the indicator mechanism and the printing mechanism in accordance with the amount set up on the keyboard or in total taking operations in accordance with the amount on the wheel of the totalizer being read or reset. Later in this specification the manner in which the segment 93 positions the type wheel will be explained.

An alining bar 98 (Fig. 2) cooperates with the segment 90 to maintain the indicator mechanism in position after the lever 76 has returned to home position, as here shown. At the beginning of machine operations the aliner 98 is disengaged from the segment 90 and is reengaged therewith after said segment 90 has been positioned as explained above.

Totalizers and transaction keys

By observing Fig. 2 it will be seen that the present machine has three lines of totalizers, an upper totalizer 99, a rear totalizer 100 and a front totalizer 101. The upper totalizer 99 is an add-subtract totalizer and has an add wheel and a subtract wheel 102 for each denominational unit, said wheels being reversely geared together so that one is always complementary to the other. In addition to the adding and subtracting wheels 102 the upper totalizer line has a plurality of sets of adding wheels which function in exactly the same manner as the front and rear totalizer wheels. The wheels of the upper totalizer line are shiftable laterally in relation to the actuators 66 under control of the first row of transaction keys 56 in the usual manner.

The rear and front totalizer lines each carry a plurality of sets of totalizer wheels 103 adapted to be selected, in the usual and well known manner, for alinement with the actuators 66 by the second and third rows of transaction keys 57 and 58 respectively. There is also a set of grand totalizer wheels on the front totalizer line arranged to be selected by depression of any of the keys 57 in the second transaction bank and a similar set of totalizer wheels on the rear totalizer line selected in a like manner by the keys 58 in the third transaction bank.

It will be noted by referring to Fig. 2 that the actuator 66 has three sets of gear teeth which cooperate respectively with the wheels on the three totalizer lines in the regular way.

Directing attention to Fig. 3, which is a sectional view of the first transaction bank and which is representative of all the transaction banks, it will be noted that the transaction banks have a latch mechanism 105 similar to the amount latch mechanism. This latch is broken or released in zero position by zero stop lever 106 and in other positions by depression of the transaction keys 56. The transaction latch 105 carries a beam 107 which by means of a link 108 differentially positions the transaction indicator segment 109 secured on the shaft 92 and a printer segment 110 loose on the shaft 94.

In adding operations selecting disks (not shown) controlled by the transaction banks cause the selected set of totalizer wheels to be engaged with the actuators 66 immediately after said actuators have completed their clockwise setting movement as explained earlier herein. Return movement counterclockwise of the actuators rotates the wheels of the selected totalizer commensurate with the amount set up on the keyboard. Immediately after the actuators arrive at home position the totalizer wheels are disengaged therefrom.

In total taking operations the different sets of totalizer wheels on the different lines are selected and alined with the actuators 66, by means of the transaction keys 56, 57 and 58 in exactly the same manner as described for adding operations. In total taking operations the different totalizer lines are selected for engagement with the actuators 66 by means of the total control keys 55 (Fig. 1). For example, depressing the first bank read key 55 in conjunction with one of the first transaction keys 56 will select the corresponding totalizer on the upper totalizer line for a reading operation. Likewise, using the first bank reset total control key in conjunction with one of the keys 56 selects the corresponding totalizer of the upper totalizer line for a resetting operation.

This key controlled total control mechanism is fully illustrated and described in copending application of M. M. Goldberg, Serial Number 559,720 referred to at the beginning of this specification.

In the instant machine, adding operations are performed in one cycle of movement of the machine and total taking operations require two cycles of movement. In the first cycle of movement of a total taking operation, the wheels of the selected totalizer are alined with the actuators 66. Likewise, in this first cycle of movement, the zero stop levers 63 (Fig. 2) break all the amount latches in zero position. At the beginning of the second cycle of a total taking operation the selected totalizer is engaged with the actuators 66 and the zero stop levers 63 are rocked out of the path of the spiders 64. Clockwise movement of the actuators revolves the wheels of the engaged totalizer in a reverse direction until they are stopped in zero position by means of a long tooth thereon. This positions the actuators commensurate with the amount on the totalizer wheels and return movement counterclockwise of the actuators in turn positions the indicating and printing mechanisms in accordance with the amount on said totalizer wheels.

In reading operations the wheels of the selected totalizer remain in engagement with the actuators 66 during their return movement counterclockwise. This rotates the wheels back to their original positions. In resetting operations the totalizer is disengaged from the actuators 66 before said actuators start their return movement counter clockwise, thereby leaving the totalizer wheels standing at zero. The usual transferring mechanism is employed for transferring amounts from lower to higher denominations.

Printing mechanism

The method of driving the columns of type wheels is by means of ring gears having external and internal teeth. The ring gears are differentially positioned by means of their external teeth, and pinions driven by internal teeth thereof operate square shafts carrying similar pinions, one for each column in which printing is to be duplicated. These pinions drive other ring gears that drive the type carriers. This method of driving type wheels is fully explained in United States Patent No. 1,693,279, issued November 27, 1927 to Walter J. Kreider, and therefore will be but briefly described herein.

In its present embodiment the instant machine is arranged to print various data and amounts in a plurality of columns on a statement sheet and on a detail strip in a single operation of the machine. This necessitates the identical setting of a series of type carriers and the method disclosed in the patent referred to above is admirably adapted for use in driving a column printing mechanism of this type. Due to the fact that the printer driving mechanism is substantially duplicated in each denominational unit it is thought that the explanation of one denominational unit and one transaction bank will be sufficient for the purpose of this specification.

Directing attention to Figs. 3, 17A and B and 17C and D, a link 113 pivotally connects the segment 110 to an arm 114 secured on a shaft 115 journaled in the main frames 50. Also secured on the shaft 115 is a gear segment 116 which meshes with a ring gear 117 rotatably supported on a disk 118 fast on a hexagonal shaft 119 supported by printer end plates 120 and 121 and intermediate plates 122 and 123. The upper ends of the plates 120, 121, 122 and 123 are supported by a bar 124 secured to the main frames 50 (see also Fig. 4) and their lower ends are secured to extensions of the base plate 51. The gear 117 (Figs. 3 and 17B) has secured thereto a gear 111 which meshes with a pinion 126 fast on a shaft 128 which also carries a pinion 127 meshing with a gear 112 fast to the side of another ring gear 125. Therefore movement of the gear 117 is transmitted to the gear 125 by means of the gears 111, 112, pinions 126 and 127 and the shaft 128. The gear 125 meshes with a first transaction type carrier 129 loosely mounted on a shaft 130 fixedly supported by the printer plates 120 to 123 inclusive.

From the foregoing description it will be seen that the differential movement of the first transaction bank latch, by means of the mechanism just described, is transmitted to the first transaction bank type carrier 129.

The type wheel operating mechanisms for the second and third transaction banks are similar to the mechanism of the first transaction bank. However, the second and third transaction banks employ an elimination mechanism similar to the zero elimination of the amount banks which is not used in the first transaction bank, and which will be described later in this specification.

*Amount type wheel driving and amount zero elimination mechanisms*

Figure 4:
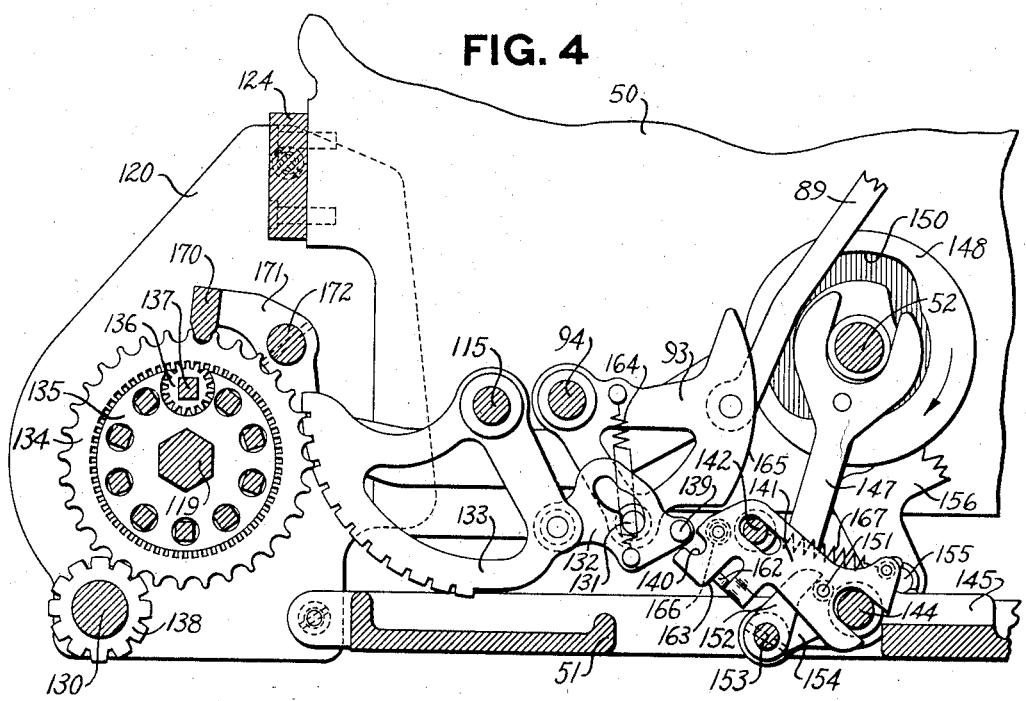
Fig. 4 is a sectional view of the mechanism for driving the type wheels of one denominational unit and also illustrating the zero elimination mechanism for that unit.

Fig. 2 is a section view taken just to the right of the $10.00 amount bank, while Fig. 4 constitutes a detail view of part of the mechanism shown in Fig. 2. By observing Figs. 2 and 4, together with Figs. 17A, 17B and 17C and 17D it will be seen that the segment 93 carries a stud 131 which cooperates with a cam slot in a cam arm 132 pivoted to a gear segment 133 loose on the shaft 115. The gear segment 133 meshes with a ring gear 134 rotatably mounted on a disk 135 supported by the shaft 119. The internal teeth of the ring gear 134 mesh with a pinion 136 on a square shaft 137 and having a bearing in a circular opening in the disk 135. The external teeth of the ring gear 134 drive a ten dollar amount type wheel 138 while other pinions 136 (Figs. 17C and D) on the shaft 137 drive ring gears 134 which in turn drive a series of type wheels in the different columnar locations on the shaft 130.

It will be noted by observing Figs. 17C and 17D that the groups of type wheels in the different columnar positions are all positioned by the amount differential mechanism. The groups used for printing data other than amounts have no type wheels driven by the units and tens of cents differential mechanism. This is due to the fact that these two lower denominations do not have zero elimination mechanism which is necessary on all the type wheels except those used to print amounts.

Figure 13:
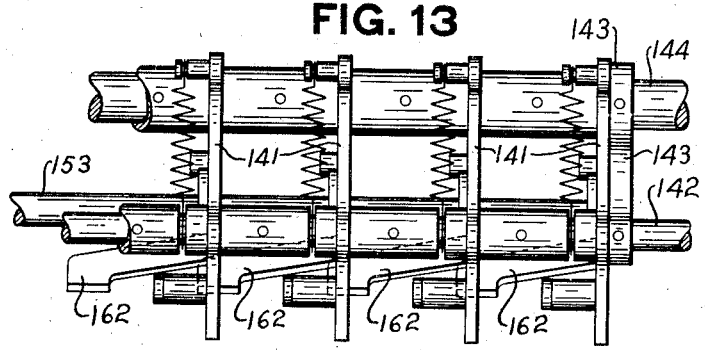
Fig. 13 is a top plan view of the zero elimination mechanism for part of the amount banks.

The cam arm 132 (Figs. 2 and 4) carries a stud 139 arranged to cooperate with a notch 140 in a zero elimination slide 141 the upper portion of which is slotted to receive a shaft 142 supported by a pair of arms 143 (Figs. 5 and 13) secured to a shaft 144 journaled in brackets 145 secured to the base plate 51. Secured on the shaft 144 (Figs. 4 and 5) is an arm 146 to which is pivoted a pitman 147 the upper end of which is bifurcated to embrace the hub of a box cam 148 secured on the shaft 52. The pitman 147 carries a roller 149 which cooperates with a cam groove 150 in the cam 148. The slide 141 (Figs. 4 and 6) has secured therein a stud 151 arranged to cooperate with a pawl 152 secured on a shaft 153 journaled in the brackets 145. Also secured on the shaft 153 is an arm 154 bifurcated to straddle a stud 155 in a cam lever 156 pivoted on a stud 157 carried by a bracket (not shown) secured to the base plate 51. The lever 156 carries rollers 158 and 159 which cooperate with the periphery of companion plate cams 160 and 161 secured to the shaft 52.

It will be recalled that with the exception of the one cent and the ten cent amount banks there is one of the slides 141 for each amount bank. The slides 141 (Figs. 5 and 13) each have an extension 162 which cooperates with an abrupt surface 163 of the slide 141 for the next higher order denomination.

In order to illustrate how the zero elimination mechanism works, let us assume that the number five key in the ten dollar amount bank 60 (Fig. 2) has been depressed. Initial movement clockwise of the differential latch and actuator mechanisms causes the latch to be broken in the fifth position, as explained earlier herein. After the actuator 66 has been thus positioned the roller 95, on the lever 76, in cooperation with the beam 87 and the link 89 positions the segment 93 commensurate with the value of the depressed amount key. A spring 164 (Fig. 4) is tensioned to urge the arm 132 upwardly to normally maintain the lower portion of the slot therein in engagement with the stud 131. Consequently when the segment 93 is positioned clockwise the arm 132 acts in the same capacity as the solid link 113 (Fig. 3) and positions the segment 133, the ring gear 134 and the tens of dollars type wheels 138 commensurate with the value of the depressed key in the ten dollar bank. The pinions 136 (Figs. 17C and 17D) position the other ring gears 134 and their associated type wheels as explained above.

Clockwise movement of the segment 93 moves an arcuate surface 165 (Figs. 2 and 4) thereof in the path of a roller 166 carried by the slide 141 to hold said slide in its normal position as here shown. This prevents the slide 141 being moved forwardly by a spring 167 when the shaft 153 (Fig. 6) and the pawl 152 are rocked counterclockwise by the lever 156 in cooperation with the cams 160 and 161 immediately after the differential mechanism has completed its initial setting movement as explained above. It will be understood that setting movement of the differentials also returns the indicator segments 90 (Fig. 2) and the printer segments 93 to zero positions in amount banks where no key is depressed. The slide 141 for the ten dollar denomination, by means of the surface 163 thereon (Figs. 4 and 13) in cooperation with the extension 162 retains the zero elimination slide for the one dollar denomination in normal position. It will be recalled that zero elimination is unnecessary in the units of cents and tens of cents denominations, consequently the zeros will print, in this instance, in the one dollar, the ten cent, and the one cent denominations.

The zero elimination slides 141 for the higher denomination are not restrained, as is the slide 141 for the ten dollar denominations; therefore when the pawls 152 are rocked counterclockwise the springs 167 move said slides 141 forwardly causing the notch therein to engage the studs 139 carried by the arms 132. Immediately thereafter the cam 148 (Fig. 5) by means of the pitman 147 rocks the shaft 144, the arms 143, the rod 142, and the zero elimination slides 141 counterclockwise. This movement of the slides 141 rocks the arms 132 (Figs. 2 and 4) for the higher denominations clockwise, causing the cam slots therein in cooperation with the studs 131, which are at this time held stationary, to rock the segments 133 one position counterclockwise. This by means of the ring gears 134, pinions 136 and shaft 137 for the higher denominations rotates the higher order type wheels one position beyond zero to a non-printing position, thereby eliminating the printing of zeros in these denominations.

Figure 5:
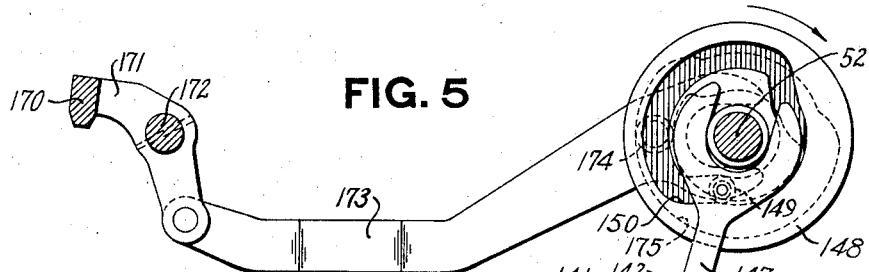
Fig. 5 is a detail view of the type wheel alining mechanism and the operating means for the zero elimination mechanism.
Figure 6:
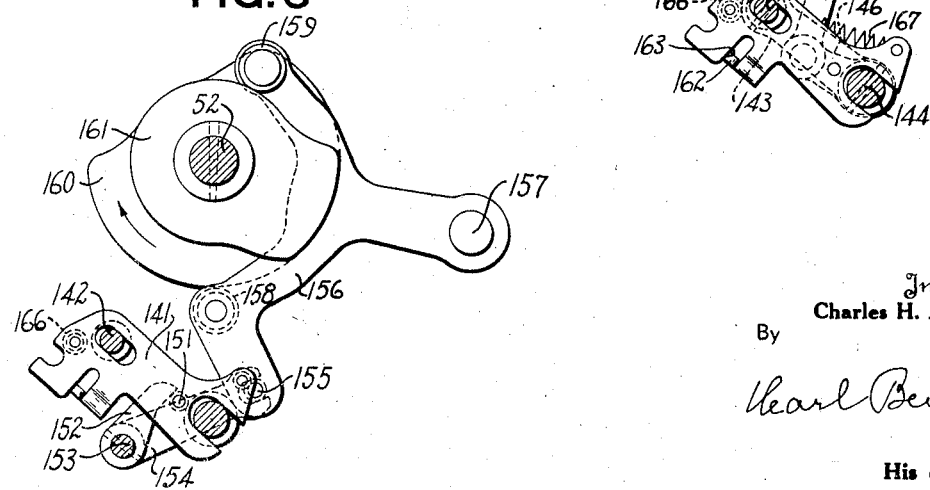
Fig. 6 is a detail view of the mechanism that controls the zero elimination slides.

Means for alining the type wheels is provided and is well illustrated in Figs. 4 and 5. This means consists of an alining bar 170 which cooperates with the ring gears 117, 125 and 134 (see also Figs. 17A and 17B). Arms 171 connect the alining bar 170 to a shaft 172 journaled in the plates 120, 121, 122 and 123. Pivoted to an extension of one of the arms 171 is a pitman 173 bifurcated to embrace a hub of the cam 148. The pitman 173 carries a roller 174 which cooperates with a raceway 175 in the lefthand face of the cam 148.

Just before the ring gears 134 receive any setting movement the cam 148 by means of the pitman 173 rocks the arms 171, the shaft 172 and the alining bar 170 clockwise to disengage said alining bar from the ring gears 134. After the ring gears are positioned as explained above the cam 148 reengages the alining bar 170 with said ring gears to hold the type wheels in position while an impression is being made.

*Control of second and third transaction type carriers during total taking operations*

The present machine has ten totalizers on the second or rear totalizer line and ten totalizers on the third or front totalizer line. As there are only nine keys in the second transaction bank and nine keys in the third transaction bank for selecting the different totalizers on these lines, it is necessary to employ the zero position in each of these bank to select the tenth totalizers for addition. Therefore, when no key is depressed in either the second or third transaction banks, the associated latches are broken at zero and thereby aline the tenth totalizers with the actuators. In the present arrangement the keys 57 in the second transaction bank, in addition to selecting their particular totalizer on the No. 2 line for addition, also select the tenth totalizer on the No. 3 line for addition to store a group total of the totalizers on the No. 2 line. Use of the keys 58 in the third transaction bank, likewise, in addition to selecting the totalizers on the No. 3 line, also select the tenth totalizer on the No. 2 line for addition. This results in a group total of the gas amounts being stored in the tenth totalizer on the No. 3 line and a group total of the electric amounts being stored in the tenth totalizer on the No. 2 line (Fig. 1).

It will be remembered that in adding operations the add-selecting plates determine whether or not the wheels of the selected totalizers are engaged with the actuators 66, and for this reason, when no key is depressed in either the second or third transaction banks, the group totalizer on each of these lines will be alined with the actuators, but due to the arrangement of the add-selecting plates, neither totalizer will be selected for engagement with said actuators.

To take a total from the No. 10 or group totalizer on the No. 2 line the read or reset key 55 (Fig. 1) for the second bank is depressed and the machine released for operation by depressing the motor bar 53. As no key is depressed in the second transaction bank the latch mechanism therefor is consequently broken by the zero stop lever thus causing the group totalizer, located in the zero position, to be engaged with the actuators and read or reset as the case may be. In this total taking operation mechanism, presently to be described, which is similar to the amount zero elimination mechanism, is employed to move the type carrier one step beyond zero to print a symbol characteristic of this particular operation.

Calling attention to Fig. 9, secured on the shaft 94 is an arm 176 connected by a link 177 to the total control plate 168, which is differentially positioned by means of the total control keys 55 (Fig. 1) to select the different totalizer lines for engagement with the actuators in read and reset operations as shown and described in the above mentioned Goldberg application Serial No. 559,720. Also fast on the shaft 94 is an arm 178 connected by a link 179 to a read and reset gear segment 180 turnably mounted on the shaft 115. The segment 180 meshes with a read and reset ring gear 181 rotatably supported by a disk 182 fast on the rod 119. The ring gear 181 (see also Figs. 17B and 17D) drives a read and reset or X & Z type wheel 183 loosely mounted on the rod 130.

As the shaft 94 is operatively connected to the total control plate 168 the differential movement of said plate is obviously transmitted to said shaft. This by means of the segment 180 and the ring gear 181 positions the type wheel 183 to print a symbol characteristic of the type of operation, read or reset, being performed.

Fast on the shaft 94 (Figs. 10 and 11) is a cam arm 184 having therein a cam slot 185 which cooperates with a stud 186 in a lever 187 pivoted on the bracket 188 mounted on the shafts 94 and 115. The lever 187 has an arcuate surface 189 which cooperates with a roller 190 carried by a slide 191 reciprocably mounted on the shaft 144 and the rod 142 in exactly the same manner as the amount slides 141 (Fig. 4) are mounted. The slide 191 (Fig. 10) has a notch 192 which cooperates with a stud 193 carried by an arm 194 pivoted on a second transaction bank gear segment 195 rotatably mounted on the shaft 115. The arm 194 has a cam slot which engages a stud 196 fast in a segment 197 pivoted on the shaft 94. The gear segment 195 meshes with a ring gear 198 (see also Figs. 17B and 17D) which drives a second transaction type wheel 199 through the medium of a gear 510, pinion 511, shaft 512, pinion 513, gear 514 and ring gear 515 in exactly the same manner as explained for the first transaction bank earlier herein.

The segments 195 and 197 (Fig. 10) and the arm 194 are substantially duplicates of the segments 133 and 93 (Fig. 2) and the arm 132, and are differentially positioned by means of a transaction bank latch mechanism similar to that shown in Fig. 3 for the first transaction bank. This is accomplished by means of a link 200 which is driven by a beam in the second transaction bank, like the beam 107 of the first transaction bank.

Figure 10:
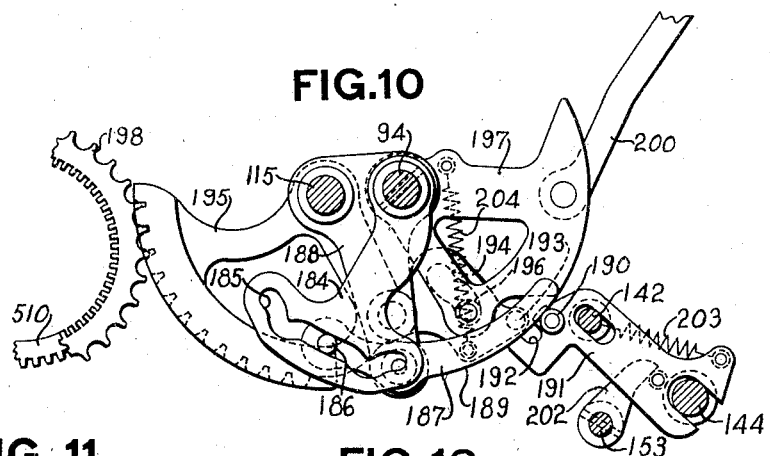
Fig. 10 is a side elevation illustrating the mechanism for positioning the second and third transaction type wheels independently of the differential mechanism.
Figure 11:
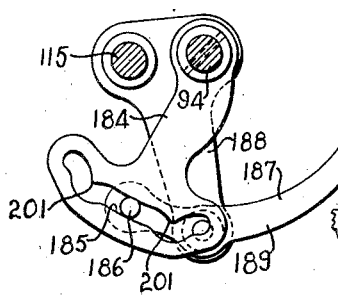
Fig. 11 is a detail view of the controlling cam for the second transaction bank.

Depressing either the read or reset key 55 (Fig. 1) for the second bank, to take a total from the group totalizer on the No. 2 line, differentially positions the total control plate 168, and by means of the mechanism shown in Fig. 9, also differentially positions the shaft 94 (Figs. 10 and 11). This positions the arm 184 (Fig. 11) so that one of the symmetrical irregularities 201 of the cam slot 185 in cooperation with the stud 186 rocks the lever 187 a slight distance counterclockwise (see also Fig. 10). This counterclockwise movement of the lever 187 disengages the arcuate surface 189 from the roller 190, and as no key is depressed in the second transaction bank, the latch therefor is broken in the zero position. Consequently the segment 197 remains in the position here shown, in which position it does not block movement of the slide 191.

At the proper time a pawl 202 secured on the shaft 153 releases the slide 191 to the action of a spring 203 which moves the notch 192 into engagement with the stud 193 carried by the arm 194. Subsequent initial movement counterclockwise of the shaft 144, rocks the rod 142 and the slide 191. The slide 191 in turn rocks the arm 194 clockwise, which by means of the cam slot therein in cooperation with the stud 196 moves the gear segment 195 a slight distance counterclockwise. This by means of the ring gear 198 and its driven train moves the second transaction type wheel 199 (Figs. 17B and 17D) one position beyond zero or home position, which when an impression is made causes an identifying symbol for the group totalizer on the No. 2 line to be printed.

Again calling attention to Fig. 10, after the impression is completed the shaft 144, rod 142 and slide 191 are returned clockwise to normal position which it will be noted returns the arm 194 counterclockwise also to normal position in which position it is retained by a spring 204.

Figure 12:
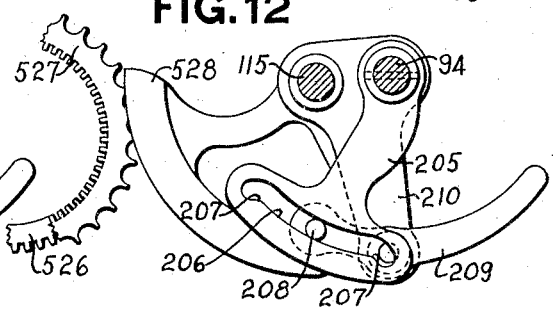
Fig. 12 is a detail view of the controlling cam for the third transaction bank.

The third transaction bank has mechanism similar to that just described for the second transaction bank for moving the third transaction bank type wheel 520 (Figs. 17B and 17D) one position beyond zero or home position to print an identifying symbol when the group totalizer on the No. 3 line is being read or reset. This type wheel 520 is driven by a ring gear 521 carrying a gear 522 meshing with a pinion 523 on a shaft 524 which also carries a pinion 525 meshing with a gear 526 secured to a ring gear 527. This gear 527 is driven by a segment 528 (see also Fig. 12) which is controlled by means of a cam arm 205 (Fig. 12) secured on the shaft 94 and having therein a cam slot 206 with symmetrical irregularities 207 which cooperate with a stud 208 carried by a lever 209 secured on a bracket 210 mounted on the shafts 94 and 115.

Depressing the read or reset key 55 (Fig. 1) for the third transaction bank positions the arm 205 so that one of the irregularities 207 is opposite the stud 208. This rocks the lever 209 in exactly the same manner as explained for the second transaction bank which by means of mechanism similar to that shown in Fig. 10 moves the segment 528 to operate the train of gears above described to move the type wheel 520 for the third transaction bank one position beyond zero or home position to print a symbol for the group totalizer on the No. 3 line, as explained above.

*Selecting mechanism*

Selecting mechanism controlled by the first transaction bank and the total control keys 55 (Fig. 1) control the operation of the impression hammers, the feeding and ejecting of the statement slips or bills, and the feeding of the detail strip.

By observing Figs. 3 and 9 it will be remembered that the shaft 115 is differentially positioned in accordance with the first transaction bank latch, and that the shaft 94 is differently positioned commensurate with the total control plate 168. Secured on the shaft 115 (Fig. 7) is a gear segment 215 which meshes with an intermediate gear 216 loose on a stud 217 secured in an auxiliary end frame 218 supported by the base 51. The gear 216 meshes with a pinion 219 secured on a shaft 220 (Fig. 18B) journaled in printer frames 221 to 224 inclusive secured in fixed relation to each other by bars 210 and 211 secured to a machine sub-base (not shown).

Secured on the shaft 94 (Figs. 7 and 8), which it will be recalled is differentially positioned by the total control plate 168, is a gear segment 225 which meshes with an intermediate gear 226 loose on the stud 217 and which in turn meshes with a pinion 227 (see also Fig. 18B) secured to a gear 228 both of which are rotatably supported by the shaft 220. The gear 228 meshes with a pinion 229 which drives a shaft 230 journaled in the frames 221 to 224 inclusive. From the foregoing description it will be seen that the shafts 220 and 230 (Fig. 7) are differentially positioned respectively by means of the first bank of transaction keys 56 (Fig. 1) and by the total control keys 55.

*Impression hammer selecting and operating mechanism*

Figures 14, 15, 16:
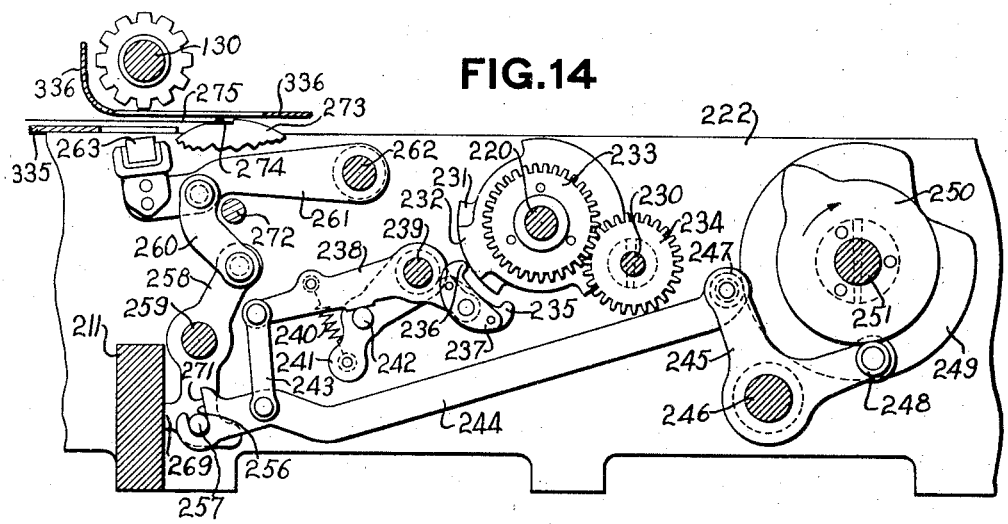
Fig. 14 is a side elevation as observed from the right of the machine illustrating the impression selecting and operating mechanism.
Fig. 15 is a detail view of the cam and arm that move the detail or audit strip to and from printing position and that also actuates the detail strip tension mechanism.
Fig. 16 is a detail view illustrating the mechanism for feeding the detail strip by hand.

Fig. 14 illustrates the impression selecting and operating mechanism for one columnar unit of the column printer. As the mechanism is substantially duplicated in each column of the printer, including the audit strip section of the printer, it is felt that the description of one such columnar unit will be sufficient for all.

Each impression unit has two selecting disks 231 and 232 (Figs. 14, 18A and 18B) the former secured on the shaft 220 and the latter rotatably supported by said shaft 220 and having secured thereto a gear 233 which meshes with a pinion 234 secured on the shaft 230. The peripheries of the plates 231 and 232 cooperate respectively with projecting tips 235 and 236 of feeler arms 237 pivoted on an extension of a lever 238 loose on a shaft 239 journaled in frames 221 to 224 inclusive. The lever 238 is flexibly connected by a spring 240 to an arm 241 secured on the shaft 239 and said spring 240 normally maintains a raised lower portion of the lever 238 in contact with a stud 242 carried by the arm 241. A link 243 pivotally connects the lever 238 to a link 244, the rearward end of which is pivoted to a bell crank 245 loose on a rod 246 supported by the frames 221 to 224 inclusive. The bell crank 245 carries rollers 247 and 248 which cooperate respectively with the peripheries of companion cams 249 and 250 secured on a shaft 251 journaled in the frames 221 to 224 inclusive.

Referring to Fig. 7, secured on the righthand end of the shaft 251 is a gear 252 which meshes with an intermediate gear 253 rotatably supported by a stud 254 carried by the plate 218. The intermediate gear 253 in turn meshes with a gear 255 secured on the righthand end of a printer drive shaft 214 journaled in the right frame 50 and the auxiliary frame 218. The shaft 214 is diametrically alined with the main drive shaft 52 and is operatively connected thereto by a clutch mechanism (not shown).

It will be recalled that in adding operations the main drive shaft 52 makes one complete clockwise rotation and in totaltaking operations it makes two complete clockwise rotations. In order to prevent the printing mechanism from making an unnecessary operation in totaltaking operations the shaft 214 is automatically declutched from the shaft 52 during the first cycle of totaltaking operations. Consequently the shaft 214 makes only one clockwise rotation in adding and totaltaking operations and due to the fact that the gears 252 and 255 are identical the shafts 214 and 251 move in synchronized relation.

Again directing attention to Fig. 14, the forward end of the link 244 has therein a notch 256 which cooperates with a stud 257 fast in a lever 258 turnably mounted on a rod 259 supported by the frames 221 to 224 inclusive. A toggle link 260 pivotally connects the lever 258 to an impression hammer 261 (Figs. 18A and 18B) rotatably mounted on a rod 262 also supported by the frames 221 to 224 inclusive. The hammer 261 carries an impression block 263 adapted to cooperate with one column of type wheels on the line 130 to make impressions on material inserted between said impression blocks 263 and said type wheels.

Fig. 23 shows the shafts 220, 239 and 251 as observed from the left of the machine. Secured on the shaft 239 (Fig. 18B) is an arm 264 having pivoted thereto a pitman 265 the rearward end of which is bifurcated to straddle the shaft 251. The pitman 265 carries a roller 266 arranged to cooperate with a cam groove 267 in a box cam 268 secured on the shaft 251.

In the initial part of machine operations the selecting plates 231 and 232 (Fig. 14) are differentially positioned by the mechanism shown in Fig. 7. Immediately thereafter the shaft 239 is rocked counterclockwise as observed in Fig. 14 (clockwise as viewed in Fig. 23) by means of the mechanism shown in Fig. 23. If an undercut portion of the plates 231 or 232 is opposite the feeler projections 235 or 236 the spring 240 will move the lever 238 in unison with the arm 241 to disengage the notch in the forward end of the link 244 from the stud 257. Therefore, when the companion cams 249 and 250 rock the bell crank 245 first clockwise and then back to normal position, the link 244 will move idly back and forth without imparting any movement to the impression hammer 261. An extension 271 of the link 244 insures that the lever 258 is in its home position after an operation in which its associated hammer 261 is disabled.

However, if the largest diameter of the plates 231 and 232 is opposite the feeler tips or projections 235 and 236, counterclockwise movement of the lever 238 will be effectively blocked and the shaft 239 and arm 241 will move independently thereof, flexing the spring 240. Consequently the notch in the link 244 will be retained in engagement with the stud 257 and initial movement clockwise of the bell crank 245, as explained above, will by means of the link 244 rock the lever 258, and by means of the toggle link 260 force the hammer 261 upwardly until the impression block 263 is pressed into engagement with its associated type wheels on the line 130. Final movement counterclockwise of the bell crank 245 returns the lever 258 and the hammer 261 to normal position, in which position it is maintained by means of a projection 269 of the lever 258 contacting the supporting bar 211 for the frames 221 to 224 inclusive.

The impression mechanism for each printing column is substantially the same as that just described with this exception: The undercut portions of the plates 231 and 232 and their relation to the feeler projections 235 and 236 are varied to properly control the printing of the columns they represent. In some of the columns the selecting plates 231 positioned by the total plate 168 alone control the operation of the hammers. In such cases the first transaction bank exercises no control whatever over the impression mechanism.

*Statement slip feeding and ejecting mechanisms*

In the instant machine statement slips are presented to the feeding means by the operator. At the beginning of a machine operation the slip is advanced by the slip feeding mechanism so that the first printing line thereon is alined with the impression mechanism. As previously brought out, the entries on one line generally consist of the result of several machine operations. Before releasing the machine for the last operation on the first line the operator ascertains whether or not the slip is to be line-spaced. If so, depressing a "multiple-item" key 56 (Fig. 1) conditions the slip-feeding mechanism to line-space the slip in the initial part of the succeeding operation. If the slip is not to be line-spaced depressing a "single-item" key 56 in the last operation for the first line of printing causes the slip to be returned forwardly by the feeding mechanism into engagement with the slip ejecting mechanism. The slip-ejecting mechanism then deposits the slip face downward in a suitable receptacle located at the front of the machine. The slip feeding and ejecting mechanisms will now be described in detail.

Figure 18B:
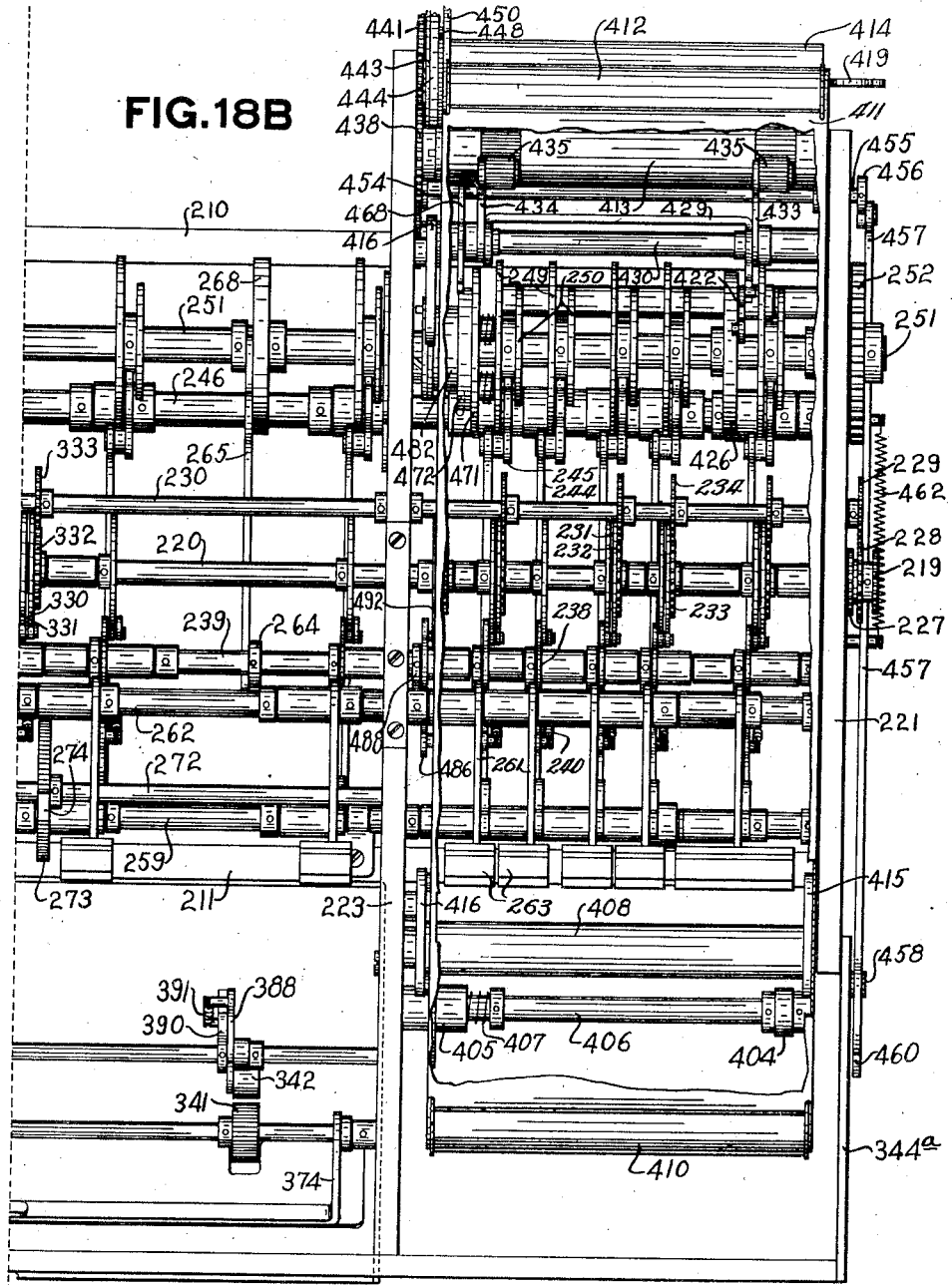

Calling attention to Figs. 18A, 18B and Fig. 19, journaled in the printer frames 222, 223 and 224, is a slip feed shaft 272 having secured thereon a pair of feeding disks 273, having in the periphery thereof right-angled cuts 274, the abrupt vertical surfaces of which form a locating stop for a statement slip 275. Cooperating with each of the disks 273 is a pressure roller 276 carried by an arm 277 pivoted to a bracket 278 secured to the base plate 51. A torsion spring 279 is tensioned to maintain the periphery of the rollers 276 in contact with the periphery of the disks 273.

Secured on the shaft 272 (Figs. 19 and 21) is a gear 280 which meshes with a rack 281 mounted for reciprocating movement by means of parallel slots 282 and 283 which cooperate respectively with rollers 284 loose on studs 285 and 286, secured in the intermediate frame 224. The lower edge of the rack 281 has therein a series of ratchet teeth 287 which cooperate with a ratchet pawl 288 loose on a stud 289 secured in the frame 224. Fast in the pawl 288 is a stud 290 straddled by the bifurcated lower end of a link 291, the upper end of which is pivoted on a stud 292 in a lever 293 loose on the shaft 239. The lever 293 is flexibly connected by a spring 295 to an arm 294 secured on the shaft 239. The spring 295 normally maintains a protruding surface of said lever 293 in contact with a stud 296 in the arm 294. A spring 297 urges the pawl 288 clockwise into engagement with the ratchet teeth of the rack 281.

Secured on the side of the rack 281 is a plate 298 having therein a series of ratchet teeth 299 which cooperate with the forward end of a pawl 300 pivoted on a slide 301 (Fig. 20) mounted for parallel reciprocating movement with the rack 281 by means of slots which embrace the rollers 284 supported by the studs 285 and 286. The slide 301 has therein a slot through which extends a stud 302 carried by a cam arm 303 loose on a stud 304 secured in the intermediate frame 224. The arm 303 carries a roller 305 adapted to cooperate with the periphery of a plate cam 306 secured on the shaft 251. A spring 307 is tensioned to urge the arm 303 counter clockwise to cause the roller to cooperate with the cam 306. An extension 308 of the pawl 300 cooperates with a camming surface 309 of a stud 310 secured in the frame 224, in a manner later to be described. A spring 311 tensioned between the pawl 300 and the slide 301 urges said pawl clockwise into engagement with the ratchet teeth 299 in the plate 298.

Referring to Fig. 20, loose on the stud 289 is a pawl 312 urged clockwise by a spring 314 into the path of a projection 313 of the slide 301. Fast in the pawl 312 is a stud 315 straddled by the bifurcated lower end of a link 316 the upper end of which is pivoted to a lever 317 loose on the shaft 239. A spring 318 flexibly connects the lever 317 to an arm 319 secured to the shaft 239 in exactly the same manner as explained for the lever 293 and the arm 294, illustrated in Fig. 19. Pivoted to the lever 317 is a feeler 320 with offset projecting fingers 321 and 322 which cooperate respectively with selecting disks 323 and 324 (Fig. 18A). The selecting disk 324 is secured to the shaft 220 and the disk 323 is loose on the shaft 220 and has secured thereto a gear 325 which meshes with a gear 326 secured on the shaft 230.

Calling attention to Figs. 18A, 18B and 19, pivoted to the lever 293 is a feeler 327 with offset projecting fingers 328 and 329 which cooperate respectively with selecting disks 330 and 331. The disk 331 is secured on the shaft 220 and the disk 330 is rotatably supported by said shaft and has secured thereto a gear 332 which meshes with a gear 333 secured on the shaft 230. A stud 334 in the frame 224 cooperates with the feelers 320 and 327, when in normal position, as shown in Figs. 19 and 20, to prevent the feeler fingers from stumbling on the mutilated edges of the selecting disks 323, 324, 330 and 331.

In use the operator inserts the statement slip 275 (Figs. 14 and 19) between a printer table 335 and a ribbon blur shield 336 interposed between the impression hammers 261 and the type wheels mounted on the type wheel line 130. The table 335 is secured to the frames 222, 223 and 224 (Figs. 18A and 18B) and the blur shield 336 is secured to the plates 120 and 121 (Figs. 17A and 17B). An inking ribbon 337 wound on reversible spools 338 and 339 passes between the slip and the type wheels and is normally prevented from contacting and blurring the type wheels by the blur shield 336. Openings are provided in the table 335 and the shield 336 opposite the printing hammers 261 and the different columns of type wheels so that said hammers may move the statement slip upward into contact with the inking ribbon to imprint various data thereon from the type wheels.

The statement slip 275 is located in the machine as shown by dot and dash lines in Fig. 22. The top edge of said slip is located against the abrupt edges formed by the right-angled cuts 274 in the periphery of the disks 273 and the lower portion of said slip rests on the top edge of an oblique ejector guide plate 340.

Upon release of the machine for operation clockwise movement of the shaft 251, as viewed in Fig. 19, causes the cam 306 to move the arm 303 clockwise and the slide 301 forwardly. The pawl 300 engages a projecting surface 345 of the plate 298 to move the rack 281 in unison with the slide 301. When the cam 306 has moved the slide 301 and the rack 281 their full distance forwardly the retaining pawl 312 engages the projection 313 of the slide 301 (Fig. 20) and the pawl 288 (Fig. 21) engages the first of the series of ratchet teeth 287 on the rack 281 to retain said slide 301 and said rack 281 in their moved positions.

Forward movement of the rack 281 rotates the gear 280, the shaft 272 and the disks 273 (Fig. 19) clockwise causing said disks 273 in cooperation with the pressure rolls 276 to feed the slip 275 rearwardly until the first printing space thereon is alined with the impression mechanism. This initial feeding of the slip 275 (Fig. 22) moves the lower edge thereof beyond the upwardly extending edge of the guide plate 340. Consequently the lower edge of the slip 275 drops below the guide 340 and comes to rest on the table 335.

Immediately after the rack 281 and the slide 301 receive their full forward movement the selecting shaft 239 (Figs. 19 and 20) and the arms 294 and 319 are rocked counterclockwise. In this initial machine operation, and in succeeding operations where entries are made in the first space on the slip 275, the selecting disks 323, 324, 330 and 331 are so positioned that the largest radii thereof are opposite the feeler fingers 321, 322, 328 and 329, respectively. This blocks the counterclockwise movement of the levers 317 and 293. Consequently the arms 319 and 294 move independently thereof, flexing the springs 318 and 395. This allows the pawls 312 and 288 to retain the slide 301 and the rack 281 in their forward positions.

If it is desired to line-space the statement sheet 275 the operator depresses the "multiple-item" key 56 (Fig. 1) in the last operation for the present space or line thereof. This by means of the first transaction bank latch mechanism differentially positions the shaft 220 and the selecting plate 324 so that an undercut portion of the periphery thereof is opposite the finger 322 on the feeler 320. Then a counterclockwise movement of the shaft 239 and the arm 319 moves the lever 317 counterclockwise to disengage the pawl 312 from the projection 313, and the slide 301 is then free to follow the cam 306 back to normal position as shown in Fig. 19. This movement of of the slide 301 does not affect the rack 281 which remains in its forward position. In the initial part of the succeeding operation, and prior to the time that an impression is taken, the slide 301 is again moved forwardly by the cam 306. As the slide 301 (Fig. 20) moves forwardly the camming surface 309 of the stud 310 in cooperation with the extension 308 of the pawl 300 allows said pawl to engage the first of the several ratchet teeth 299 (Fig. 21) in the plate 298. The rack 281 is then advanced one step against the tension of its spring 344 to rotate the shaft 272 and the feeding disks 273 clockwise as viewed in Fig. 19 to line-space the statement slip 275. The retaining pawl 288 engages the second ratchet tooth 287 to retain said rack 281 in its moved position. The pawl 312 again retains the slide 301 in its forward position, as shown in Fig. 20 until the "multiple-item" key 56 (Fig. 1) is again depressed.

In case it is desirable to print only in one space of the statement slip, in the last operation for this space, depressing the "single-item" key 56 (Fig. 1) positions the selecting plates 324 and 331 so that undercut portions of their peripheries are opposite the fingers 322 and 329 of the feelers 320 and 327 respectively. This allows the levers 317 and 293 to be rocked counterclockwise by the arms 319 and 294 and consequently the pawls 312 and 288 are disengaged from the slide 301 and the rack 281. This permits both the slide 301 and the rack 281 to follow the cam 306 back to normal position to return the slip 275 forwardly, after the printing is completed, causing the lower edge of said slip (Fig. 22) to be deflected downwardly by the guide 340 and guided thereby between a series of slip ejector rolls 341, (see also Figs. 18A and 18B) and their associated pressure rolls 342. The manner in which the statement slips are ejected will be described later herein.

From the foregoing description it is obvious that depressing the "multiple-item" key 56, in any machine operation, causes the statement slip to be line spaced in the succeeding operation, prior to the time the impression mechanism functions. Also that depressing the "single-item" key in any machine operation causes the statement slip to be returned forwardly to the ejecting mechanism immediately after an impression is made.

Depressing the first bank reset key 55 (Fig. 1) positions the selecting plates 323 and 330 so that undercut portions of their peripheries are opposite the fingers 321 and 328 of the feelers 320 and 327 respectively. This allows both the slide 301 and the rack 281 to be returned rearwardly to their normal positions to return the statement slip forwardly into engagement with the ejecting mechanism in exactly the same manner as just described in connection with the "single-item" key 56.

It is not desired to limit the control of the feeding of the statement slips to the "multiple-item" and "single-item" keys 56 and the first bank reset key 55, as it can readily be seen that by properly undercutting the selecting plates 323 and 324, 330 and 331 (Figs. 19 and 20) and by properly locating said selecting plates in relation to the feelers 320 and 327 the feeding of the statement slip may be controlled by any of the total keys 55 (Fig. 1) or by any of the keys 56 in the first transaction bank, or by any combination of the keys 55 and 56.

*Statement slip ejecting mechanism*

Operation of the slip ejecting mechanism is controlled by means of selecting discs operated by the shafts 220 and 230 (Fig. 22) in exactly the same manner as the impression hammers and the slip feeding mechanism. In addition to determining when the slip will be ejected, the selecting mechanism reduces the wear of the ejecting mechanism by preventing unnecessary operation thereof. Eliminating unnecessary operation of the ejecting mechanism also substantially reduces the operating noise of the machine.

Referring to Figs. 18A, 18B and Fig. 22, the latter being a side elevation of the ejecting mechanism as observed from the left of the machine, it will be noted that the ejector rolls 341 are secured on a shaft 346, the middle portion of which is journaled in brackets 347 secured to a bar 348 which connects the printer frames 222 and 223, and an extension 344a of the frame 221. The right end of the shaft 346 is journaled in the frame 223 and the left end of said shaft is journaled in a sleeve 349 turnably supported by the frame 222.

Secured on the lefthand end of the shaft 346 is a pinion 350 which meshes with a segment 351 loose on a stud 352 fast in the frame 222. A link 353 operatively connects the segment 351 to a cam arm 354 rotatably supported by a stud 355 secured in the frame 222. The arm 354 carries a roller 356 adapted to cooperate with a plate cam 357 secured on the shaft 251. A spring 358 is tensioned to urge the segment 351 clockwise and the cam arm 354 counter clockwise to normally maintain the roller 356 in contact with the periphery of the plate cam 357. The link 353 carries a stud 359 which cooperates with a pawl 360 loose on a stud 361 in the frame 222. A bifurcated portion of the pawl 360 cooperates with a stud 362 in a lever 363 loose on the shaft 239. Lever 363 is resiliently connected by a spring 365 to an arm 364 secured on the shaft 239. Pivoted on the lever 363 is a feeler 366 (see also Figs. 23 and 25), having offset projecting fingers 367 and 368 which cooperate respectively with a selecting disk 369 secured on the shaft 220 and a selecting disk 370 loose on the shaft 220. The disc 370 has secured thereto a gear 371 meshed with a gear 372 secured on the shaft 230.

Loose on the shaft 346 (Figs. 18A, 18B and Fig. 22) are arms 373, 374 and 375, connected together by a bail 376. The arms and the bail 376 support a curved guide plate 377 which turns the statement slips face downward and guides them into the receptacle 343 in a manner presently to be described. Secured in the arm 373 is a hub 378 clutched to the sleeve 349 which has secured on its left end a plate 379 (Fig. 24) with a slot 380 arranged to cooperate with a stud 381 carried by the segment 351. A continuation of one side of the slot 380 forms an arcuate surface 382 which cooperates with the stud 381.

Each of the pressure rolls 342 is secured to an arm 388 loose on a shaft 389 journaled in the frames 222, 223 and 224. Secured on the shaft 389 are arms 390 flexibly connected to the arms 388 by means of a spring 391 stretched between said arms 390 and 388. Secured on the lefthand end of the shaft 389 is an arm 392 operatively connected by a link 393 to a cam arm 394 loose on a stud 395 secured in the frame 222. The arm 394 has rotatably mounted thereon a roller 396 which cooperates with the periphery of a plate cam 397 secured on the shaft 251. A spring 398 is tensioned between the link 393 and a stud secured in the frame 222 to urge the cam arm 394 counterclockwise to maintain the roller 396 in contact with the cam 397.

In Fig. 22, the slip ejecting mechanism is shown in the position it occupies after having functioned in the preceding machine operation and is now ready to be restored at the beginning of the next machine operation. In the first part of the succeeding machine operation the cam 357 rocks the arm 354 clockwise as viewed in Fig. 22, which by means of the link 353 rotates the gear segment 351 counterclockwise, which by means of the pinion 350 rotates the shaft 346 and the ejector rolls 341 in a clockwise direction. As the link 353 moves rearwardly the stud 359 wipes along an angular surface 399 of the pawl 360 to move said pawl clockwise against the tension of a spring 400. When the stud 359 passes beyond the surface 399 the spring 400 returns the pawl 360 counterclockwise to move an obstructing surface 401 in the path of the stud 359.

Just before the slip ejecting mechanism is restored, as explained above, the cam 268 (Fig. 23) by means of the pitman 265 and the arm 264 rocks the shaft 239 clockwise as viewed in this figure. This by means of the arm 364 and the spring 365 attempts to rock the lever 363 also in a clockwise direction. If the full radii of the plates 369 and 370 are opposite the fingers 367 and 368 of the feeler 366 the lever 363 will be blocked against clockwise movement. Consequently the lever 363 will remain in the position shown in Figs. 22 and 23, and the pawl 360 will be free to block the ejecting movement of the link 353 and associated mechanism, as explained above.

In case an undercut portion of either of the plates 369 and 370 is opposite either of the feelers 367 and 368 the lever 363 will move clockwise in unison with the arm 364 thereby causing the stud 362 in cooperation with a projection of the bifurcated portion of the pawl 360 to rock said pawl clockwise so that the surface 401 is out of the path of the stud 359. This allows the cam arm 354 under tension of the spring 358 to follow the cam 357 back to the position shown in Fig. 22, which by means of the link 353 rotates the segment 351 clockwise, which in turn rotates the shaft 346 and the slip ejecting rolls 341 counterclockwise.

Just before the segment 351 starts its ejecting movement clockwise the cam 397 rocks the arm 394 clockwise, which through the link 393 rocks the arm 392 and the shaft 389 and the arms 390 counterclockwise. The springs 391 cause the arms 388 to move in unison with the arms 390 until the lower edge of the statement slip is gripped between the pressure rolls 342 and the ejector rolls 341.

It will be recalled that after all the entries have been made on the slip 275 (Fig. 22) it is returned forwardly by means of the feed rolls 273 and its lower edge is directed downwardly by the guide 340 until said lower edge is interposed between the rollers 341 and 342. After the statement sheet 275 is gripped between the ejector rolls 341 and the pressure rolls 342, as explained above, the segment 351 starts its ejecting movement clockwise to rotate the shaft 346 and the rolls 341 counterclockwise to eject the slip 275.

Restoring movement counterclockwise of the segment 351, by means of the stud 381, rocks the plate 379 (Figs. 22, 18A and 18B) the sleeve 349, the yoke bail 376 and the curved guide plate 37 clockwise. Just before the stud 381 passes beyond the arcuate surface 382 the periphery of a segment 383, fast on the gear segment 351, passes under a rounded projection 402 of the plate 379 (see also Fig. 24) to retain the guide plate 377 in its clockwise position, (as shown in Fig. 24) while the slip is being ejected. Thus it can be seen that during the ejection of the slip the guide 377 inverts the slip by directing the lower edge thereof rearwardly.

Near the end of the clockwise ejecting movement of the segment 351 the stud 381 reengages the slot in the plate 379 to restore the shaft 346 and the guide plate 377 counterclockwise to the position shown in Fig. 22. This moves the guide plate 377 out of the path of the upper edge of the statement slip, thus allowing the slip to settle properly in the receptacle 343. This inverting of the slips during their ejection deposits them in the receptacle 343 in the same order in which they were fed through the machine, a very essential procedure, as will be seen when the method of operation is explained.

*Audit or detail strip feeding mechanism*

Most of the audit strip feeding mechanism is contained between the frames 221 and 223 (Figs. 18A and 18B), while a small portion of the mechanism is mounted on the outside of the frame 221.

In the initial part of machine operation, a laterally slidable table moves a portion of the audit strip, wound therearound, rearwardly into printing position. After the impression is made, the slidable table is returned forwardly to return the audit strip from the impression mechanism so that the last impression thereon will be visible. After the impression is made and while the audit strip is being thus returned the feeding thereof takes place.

Like the impression operating mechanism and the statement slip feeding mechanism the audit strip feeding mechanism is under the selective control of the first transaction bank and the total control keys.

The audit strip receiving roll or reel is driven by a slippage member which insures the fed amount of the strip being wound thereon regardless of the circumference of the receiving roll. The audit strip feeding mechanism briefly outlined above will now be described in detail.

Referring to Figs. 18B and 26, the core of an audit strip supply roll 403 fits loosely over a bushing 404 and tight on a friction hub 405 both of which are loose on a rod 406 secured in the printer frame 223. A compression spring 407 provides a drag on the hub 405 to prevent the supply roll unwinding too freely. The web of the audit strip is threaded around a flanged roll 408 loose on a stud 409 secured in the frame 223, thence around another flanged roll 410 supported by right-angled ears of an audit strip table 411. The audit strip is then carried across the face of the table 411, thence around a roller 412 supported at the rearward end of the table 411 in the same manner as the roll 410. The web of the audit strip continues around a feeding roll 413 and from the feeding roll it is attached to and wound upon a supply roll 414 by means of a key 419 in the well known manner.

The table 411 is supported for horizontal sliding movement between the frames 221 and 223 by means of opposed plates 415 and 416 secured on the bent-over sides of the table 411 and located near opposite ends thereof. The plates 415 and 416 each have slots adapted to receive rollers 417 loose on studs 418, two of which are secured in the frame 221 and two in the frame 223.

The audit strip table 411 (Figs. 15 and 18B) carries a bracket 420 bifurcated to receive a stud 421 in a cam arm 422 loose on a stud 423 secured in the frame 421. The arm 422 carries a roller 424 which cooperates with a cam groove 425 in a box cam 426 secured on the shaft 251. Fast in the arm 422 is a stud 427 which cooperates with an extension 428 of a yoke 429 rotatably supported on a rod 430 extending between the frames 221 and 223. The yoke 429 has downwardly extending arms 431, bifurcated to straddle studs 432 carried by bell cranks 433 and 434 loose on the rod 430. The bell cranks 433 and 434 carry rollers 435 adapted to grip the audit strip 403 against the feed roll 413 in a manner presently to be described.

The feed roll 413 (Figs. 26 and 28) has tenons which engage a clutch 437 cut in the hub of a gear 438, loose on the rod 436. The gear 438 is operatively connected, by a pinion 439 loose on a stud 440 secured in the frame 223, to a gear 441 loose on a stud 442 secured in the frame 223, said stud 442 also rotatably supports the receiving reel 414 (Fig. 27). Secured to the gear 441 is a plate 443 to which is pivoted the lower ends of symmetrical segments 444 between the upper free ends of which is stretched a spring 445. Concentric internal radial surfaces 446 of the segments 444 cooperate with the periphery of a disk 447 (see also Fig. 16) secured to the reel 414.

Secured between the disk 447 and the reel 414 is a ratchet wheel 448, adapted to cooperate with a pawl 449 pivoted on a plate 450 turnably supported on an undercut portion of the reel 414 between the ratchet 448 and said reel 414. The pawl 449 has a tail 451 which cooperates with a projection 452 of a link 453 pivotally connecting the plate 450 to an arm 454 secured on the left end of a shaft 455 opposite ends of which are journaled in the frames 221 and 223. Secured on the righthand end of the shaft 455 is an arm 456 to which is pivoted one end of a link 457 having therein a slot through which extends a stud 458 secured in the extension 344 of the frame 221 (see also Fig. 18B). An upturned extension 460 on the link 457 protrudes through an opening in the machine cabinet and forms a convenient finger piece for operating the audit strip receiving reel by hand.

Forcing the link 457 (Figs. 16 and 26) rearwardly revolves the plate 450 and lowers the projection 452 of the link 453 to allow the pawl 449 to engage the ratchet 448 under tension of a spring 461. Continued rearward movement of the link 457 revolves the plate 450 counterclockwise a distance determined by the stud 458 in cooperation with the slot in the link 457. This by means of the pawl 449 also revolves the ratchet 448 and the reel 414 a like distance counterclockwise to hand-feed the audit strip. A spring 462 returns the link 457 forwardly to normal position to disengage the pawl 449 from the ratchet 448.

An intermediate gear 466 (Fig. 28) pivoted on a stud secured in the frame 223 operatively connects the gear 438 to a pinion 467 secured to a Geneva gear 468 loose on the shaft 430. The Geneva gear 468 has a plurality of U-shaped slots 469 which cooperate with a stud 470 fast in a plate 471 loose on the shaft 251 (see also Figs. 29 and 31). Secured to the plate 471 is a Geneva disk 472 the periphery of which is adapted to cooperate with a series of arcuate surfaces 473 of the Geneva gear 468 to retain said Geneva gear in position when it is not being actuated by the stud 470.

Referring to Figs. 30, 31 and 32, integral with the plate 471 and the disk 472 is a hub 474 slotted to receive tenons 475 of a driving plate 476 secured on the shaft 251. A raised portion 477 of the face of the hub 474 cooperates with a camming lug 478 on the face of a bushing 479 secured in the frame 223 and forming a bearing for the shaft 251. The bushing 479 has symmetrical slots 480 which cooperate with tenons 481 of a bushing 482 loosely supported by the hub 474 and retained in position by means of a flange 483 on the bushing 482 which fits loosely in an annular groove formed between the hub 474 and the disk 472.

Secured on another flange of the bushing 482 is a plate 484 connected by a link 485 to a lever 486 (Fig. 29) loose on the shaft 239 and flexibly connected by a spring 487 to an arm 488 secured on the shaft 239. The lever 486 has pivoted thereon a feeler 489 with projecting fingers 490 and 491 which cooperate respectively with selecting disks 492 and 493. The disk 492 is secured on the shaft 220 while the disk 493 is loose on said shaft and has secured thereon a gear 494 which meshes with a gear 495 secured on the shaft 230.

Directing attention to Figs. 28, 31 and 32, the shaft 251 makes one complete clockwise rotation each machine operation. This by means of the plate 476 and the hub 474 drives the disk 472 and the plate 471 in unison with said shaft 251. This causes the stud 470 on the plate 471 to engage one of the U-shaped notches 469 in the Geneva gear 468 to rotate said Geneva gear one increment of movement counterclockwise. A cut-away portion 496 of the periphery of the disk 472 provides the clearance necessary to allow the Geneva gear 468 to rotate. Counterclockwise movement of the Geneva gear 468 by means of the pinions 467 and 466 rotates the gear 438 and the feed roll 413 (see also Fig. 26). The gear 438 by means of the pinion 439 rotates the gear 441 and the plate 443 also in a counterclockwise direction. The segments 444 being in frictional engagement with the disk 447 (Fig. 16) rotate the receiving reel 414 in unison with the plate 443.

Prior to the time that the stud 470 carried by the plate 471 engages and rotates the Geneva gear 468, the cam 426 (Figs. 15 and 26) rocks the lever 422 clockwise to move the stud 427 away from the extension 428 of the yoke 429. Springs 497 then urge the bell cranks 433 and 434 clockwise causing the pressure rollers 435 to engage and press the audit strip 403 into contact with the feeding roller 413. The pressure rolls 435 continue to hold the audit strip 403 in contact with the feed roll 413 while the Geneva gear 468 is being rotated by the stud 470, which as explained above also rotates the feed roll and the receiving reel 414 in a counterclockwise direction. This causes the feed roll 413 to unwind the audit strip web from the supply reel 403 after the impression mechanism has functioned and while the audit strip table 411 is being returned forwardly to normal position. As fast as the audit strip is fed by the feed roll 413 it is wound on the receiving reel 414.

The fact that the audit strip feed is the same each machine operation and that less movement of the receiving reel is required to wind the fed portion of the strip thereon when the diameter of the receiving roll increases necessitates the frictional connection, just described, between the plate 443, (Fig. 28) which has a constant or fixed movement each machine operation, and the receiving reel 414, the movement of which varies with the circumference of the receiving roll. Therefore, after the fed amount of the audit strip has been wound around the receiving roll the shoes or segments 444 slip around the periphery of the disk 447 (Figs. 16 and 27) without imparting further movement to said receiving reel 414.

As in the case of the statement slip, it is sometimes necessary to make several impressions on a single line of the audit strip and this necessitates control of the feeding mechanism which is accomplished by means of the selecting plates 492 and 493 (Figs. 26 and 29) and cooperating mechanism. Before the Geneva gear 468 receives its feeding movement, the shaft 239 and arm 488 are rocked counterclockwise as previously explained. If an undercut portion of the disks 492 or 493 is opposite the fingers 490 and 491 of the feeler 489 the lever 486 by means of the spring 487 is moved in unison with the arm 488. This by means of the link 485 shifts the bushing 482 (Figs. 31 and 32) counterclockwise to aline the tenons 481 with the symmetrical slots 480 in the bushing 479. When the machine is at rest and during the earlier part of machine operation, when the shaft 239 receives its counterclockwise movement, the raised portion 477 of the hub 474 is opposite the camming lug 478 of the bushing 479.

Immediately after initial movement of the shaft 239 (Fig. 29) and the arm 488 which as previously explained causes the feeler 489 to feel for the low or undercut portion of the selecting disks 492 and 493, the raised surface 477 of the hub 474 moves beyond the lug 478. This allows a plurality of springs 498 loose on studs secured in the plate 471 and compressed between said plate 471 and one of the audit strip hammer operating cams 249 to shift the entire unit, consisting of the plate 471, disk 472, hub 474 and the bushing 482 toward the left, thus causing the lugs 481 to enter the slots 480 in the stationary bushing 479. This shifts the stud 470 into alinement with the Geneva gear 468 and also moves the recessed portion 496 of the disk 472 opposite the Geneva gear so that said stud 470 will engage and rotate said Geneva gear and associated mechanism to feed the audit strip in the manner set out above.

Immediately after the feeding takes place the raised portion 477 of the hub 474 engages the camming lug 478 to shift the audit strip feed operating unit toward the right to ineffective position to disengage the tenons 481 from the slots 480 in the bushing 479 prior to return movement clockwise of the shaft 239 and the arm 488. This allows the arm 488 to restore the lever 486 to normal position, as shown in Fig. 29, which by means of the link 485 returns the bushing 482 clockwise to move the tenons 481 out of alinement with the slots 480.

If the selecting plates 492 and 493 (Figs. 26 and 29) are so positioned that the largest radii thereof are opposite the feeler fingers 490 and 491, the lever 486 will be prevented from moving in unison therewith. This will result in no movement being imparted to the bushing 482, and consequently the tenons 481 will remain out of alinement with the slots 480 in the bushing 479. When the raised portion 477 (see also Figs. 30, 31 and 32) of the hub 474 moves beyond the camming lug 478 on the face of the bushing 479 the tenons 481 of the bushings 482, will engage the face of the bushing 479 to retain the plate 471 and the disk 472 in ineffective position, as shown in Fig. 32. Consequently the stud 470 and the recessed portion 496 of the disk 472 will remain out of alinement with the Geneva gear 468 and therefore no movement will be imparted to the audit strip feeding mechanism.

The mechanism just described provides a means under control of the first transaction bank and the total control keys for selectively controlling the feeding of the audit strip.

*Method of operation*

In explaining the method of operating the instant machine let us take as an example a public utility company supplying electrical current and gas to a plurality of consumers in a large city. Each consumer has a meter to measure the consumption of electrical current in kilowatt hours and a meter to measure the consumption of gas in cubic feet. A city is generally divided into districts, the proper size to be handled by one employee, whose duty it is to read the meters in his district periodically, generally once each month. Each district is subdivided into routes, each route being of the proper size to be covered in one day by the meter reader. There is a meter reader's book for each daily route, and these books contain in logical order and upon individual sheets, the name and address of each subscriber and the route number, together with the meter readings from the previous month.

The meter reader copies the present electric and gas meter readings on each customer's chart or sheet and manually subtracts the previous readings from the present readings and enters these differences, which in the first instance is the kilowatt hours of electricity consumed and in the second the cubic feet of gas consumed, in the proper place upon the sheet. At the end of the day the book for the route covered is turned over to the audit department, where the rate is figured from charts and the cost of the electricity and gas consumed entered upon each subscriber's sheet.

From the audit department the meter books go to the billing department, where individual bills or statement slips similar to that shown in Fig. 33 are made out from data contained in said meter book. An accounting machine similar to the one described herein is generally employed in printing the statement slips.

With the totalizers of the machine clear, the operator starts making out the statement slips for a particular meter book. After all the bills or slips are made out for that particular book, the totalizers are cleared and the portion of the audit strip (Fig. 34) covering the computations for said particular book is removed from the machine and accompanies the book to the checking department, where the statement slips and the audit strip are checked against the meter book. All the meter books for the different routes are treated in this manner.

Naturally there are many systems used by the different companies for making out electric and gas statement slips, but the system outlined above, it is believed, in a general way covers the majority of systems now in use. However, the machine of this invention being very flexible in nature, may, with minor alterations, be adapted to most any logical system.

The manner in which one account is handled on the accounting machine will now be described. The operator places the meter book covering one of the various routes in a convenient holder on the left of the machine. The statement slips or bills which have previously been addressed and arranged in sequential agreement with the pages of the meter books, are placed conveniently for the operator directly in front of the slip table.

The statement slips, Fig. 33, are generally divided into four parts, a "bookkeeping coupon," a "consumer's bill" and "return stub," and a "collector's coupon." The operator inserts the first statement slip, which corresponds to the first page of the meter book, face up in the machine and locates the upper edge thereof against the abrupt vertical edge of the undercut portions 274 of the statement slip feeding disks 273 (Fig.

19) and proceeds to make out the bill according to the data in the meter book. After the statement slip is made out it is ejected forwardly by means of mechanism shown in Fig. 22 and deposited in the receptacle 343, face downward, as explained herein before.

The next bill is placed in the machine and acted upon in the same manner as above until the operator comes to the statement slip for John Doe, a facsimile of which is shown in Fig. 33. After properly inserting the statement slip in the machine, the operator sets up on the keyboard the prior electric meter reading, in this case 32092, depresses the "prior" key 56 (Fig. 1), and releases the machine for operation by depressing the motor bar 53. This causes the prior electric meter reading to be subtracted from the previously cleared No. 1 or add-subtract totalizer.

It will be recalled that only the seven higher denominational rows of amount keys 59 are used for printing the prior and present meter readings, as the two lower denominations do not have zero elimination, which makes them unsuitable for this purpose.

During this operation of the machine the prior electric meter reading is simultaneously printed in the proper columns of the "bookkeeping coupon" and "consumer's bill" of the statement slip 275, and upon the audit strip 403, a fragment of which is shown in Fig. 34.

Next the present electric meter reading, 32172, is set up on the keyboard, and the "present KWH" key 56 depressed, which when the machine is operated causes the present meter reading to be added to the complement of the prior meter reading contained in the add-subtract totalizer, the result being the difference between the prior and present meter readings. Also during this operation the present electric meter reading is printed in the proper columns of the statement slip 275 and the audit strip 403 and in both cases upon the same line as the prior meter reading.

Immediately following this operation there are two automatic machine operations, the first of which clears the add-subtract totalizer and prints the difference (in this case 80) between the prior and present meter readings, which is the kilowatt hours of current consumed, in the different columns of the statement slip and the audit strip. In the second automatic machine operation the amount of kilowatt hours consumed (80) is automatically repeated and added into a grand totalizer for kilowatt hours, represented by the "KWH" key 56 in the first transaction bank.

In the next machine operation the operator sets up the amount of the bill, in this case $6.30, which is obtained from the meter reader's book, depresses the rate key 58 in the third transaction bank corresponding to the amount of current consumer, and the "multiple-item" key 56 in the first transaction bank. Releasing the machine for operation causes the amount $6.30 to be added in the proper rate totalizer, selected by the key depressed in the third transaction bank, in a "total $ elec." totalizer located in the zero position of the No. 2 line, selected by depressing any of the keys 58 in the third transaction bank, and this amount is also added in the "multiple-item" totalizer on the No. 1 line selected by the "multiple-item" key 56. Also in this operation the amount of the electric bill, $6.30, is simultaneously printed in columns headed "amount of bill" upon all four parts of the statement slip 275 and also in the amount column of the audit strip 403. It will be noted that all four of the above items are printed upon the same line of the statement slip and audit strip.

In the next operation the prior gas meter reading (67933) is set up on the amount keys, the "prior" key 56 depressed, and the machine released for operation by depressing the motor bar 53. During the initial part of this operation the statement slip 275 and the audit strip 403 are line-spaced, which is effected by depressing the "multiple-item" key 56 in the preceding operation. In this operation the prior gas meter reading is printed upon the second line and in two columns of the statement slip and upon the second line in the proper column of the audit strip 403 and this prior meter reading is also simultaneously subtracted from the cleared No. 1 or add-subtract totalizer.

In the next operation of the machine the present gas meter reading (67963) is set up on the keyboard, the "present 100's cu. ft." key 56 depressed and the machine released for operation. During this operation of the machine the present meter reading is printed in the proper columns of the statement slip, and the audit strip, and simultaneously added to the complement of the prior meter reading contained in the add-subtract totalizer. The result of this computation is the difference between the present and prior meter readings (30), which is the hundred cubic feet of gas consumed by the subscriber.

In the first of the two succeeding automatic operations, the add-subtract totalizer is cleared and the difference between the present and prior meter readings, (30) is printed in the proper columns of the statement slip 275 and the audit strip 403. In the second automatic machine operation the difference (30) between the present and prior gas meter readings is added in a grand totalizer for the gas consumed represented by the "100's cu. ft." key 56 in the first transaction bank.

In the next machine operation the price of the gas consumed, in this case $3.60, is set up on the amount keys, the proper gas rate key 57 in the second transaction bank and the "multiple-item" key 56 in the first transaction bank are depressed, and the machine released for operation. In this operation the amount ($3.60) is printed in the four amount columns of the statement slip 275 and in the amount column of the audit strip 403. This amount ($3.60) is also simultaneously added in the proper rate totalizer on the No. 2 line selected by the key depressed in the second transaction bank, and in a "total $ gas" totalizer located in the zero position of the No. 3 line, selected by depressing any key 57 in the second transaction bank. This amount is likewise added to the amount of the electric bill contained in the "multiple-item" totalizer located on the No. 1 line and selected by the "multiple-item" key 56.

In the final operation the "multiple-item" key 56 in the first transaction bank, together with the "reset" key 55 for the first transaction bank, is depressed and the machine released for operation. At the beginning of this operation the statement slip and the audit strip are again line-spaced, after which the "multiple-item" totalizer is cleared and the total amount of the bill, $9.90, is printed in the four amount columns of the statement slip and in the amount column of the audit strip 403. In this final operation, after the impression is completed, the statement slip 275 is returned forwardly to the ejecting mechanism, which as previously explained, turns the slip face downward and deposits it in a receptacle 343 (Fig. 22) located at the front of the machine.

It is estimated that 90% of the errors made by meter readers are in subtracting the prior from the present meter readings, to determine the consumption, and only 10% of the errors are made in copying the meter readings. Due to the fact that the instant machine mechanically calculates the consumption, an excellent means is provided for checking the meter reader's calculations.

In case the statement slip contains only a single item, for example, electricity, in the final operation for that item, when the amount of the bill, $6.30 is printed, instead of depressing the "multiple-item" key in the first transaction bank, the "single-item" key 56 is depressed. This causes the bill to be returned forwardly near the end of machine operation and presented to the ejecting mechanism.

After all the statements have been made out for a particular meter book the "KWH" totalizer on the No. 1 line is released to print the grand total kilowatt hours' consumption (1826), upon the audit strip. This is accomplished by depressing the "KWH" key 56 in conjunction with the first bank "reset" key 55 and releasing the machine for operation, by means of the "motor bar" 53.

Next the grand total ($114.50) of electric amounts is printed upon the audit strip by clearing the ("total $ elec.") totalizer on the No. 2 line. This is accomplished by depressing the second bank "reset" key 55 and releasing the machine for operation.

After this the grand total (1600) of the hundred cubic feet of gas consumed is printed upon the audit strip by clearing the "100's cu. ft." totalizer on the No. 1 line. This is accomplished by depressing the "100's cu. ft." key 56 in conjunction with the first bank "reset" key 55 and operating the machine.

Finally the "total $ gas" totalizer on the No. 3 line is cleared to print the grand total ($155.10) of gas amounts upon the audit strip. This is accomplished by depressing the third bank "reset" key 53 and releasing the machine for operation in the usual way.

After this the meter book, the statement slips 275 for that particular book, and the portion of the audit strip 403 containing all the transactions in said particular book, are placed together and turned over to the audit department for checking. In this final check-up the mechanical entries on the audit strip 403 are compared with the entries in the meter reader's book, and the amounts arrived at by the auditing department. This latter includes a grand total of the electrical current consumed, a grand total of the cost of this current to the consumer, a grand total of the gas consumed, and a grand total of the cost of this gas to the consumer.

While the form of mechanism here shown and described is admirably adapted to fulfill the objects primarily stated, it is to be understood that it is not intended to confine the invention to the form or embodiment herein disclosed, for it is susceptible of embodiment in various forms all coming within the scope of the claims which follow.

What is claimed is:

1. In a machine of the class described the combination of record material feeding means; means to actuate the feeding means; means to drive the actuating means; means to retain the actuating means in moved position; means to retain the driving means in moved position; and means to selectively control the effectiveness of each of the retaining means.

2. In a machine of the class described the combination of record material feeding means; means to actuate the feeding means; means to drive the actuating means; means to retain the actuating means in moved position; means to retain the driving means in moved position; two groups of control keys; and means controlled by said control keys to selectively control the effectiveness of either or both retaining means.

3. In an accounting machine, the combination of means to make impressions on record material; means to feed record material to the impression means; means operable in one direction to actuate the feeding means to feed the record material to printing position and in another direction to move it from printing position; and means to impart an initial movement to the actuating means in said one direction to advance the record material to printing position, said imparting means also operable to impart step by step movements to the actuating means in said one direction to line-space the record material.

4. In a machine of the class described, the combination of means to make impressions on record material; means to feed the record material to and away from the impression means; means to actuate the feeding means; means to impart an initial movement and succeeding step by step movements to the actuating means; means to retain the imparting means in moved position to prevent step by step movement of the actuating means; and means to control the effectiveness of the retaining means.

5. In an accounting machine the combination of means to make impressions on record material; means to feed the record material to and away from the impression means; means to actuate the feeding means; operating means to impart an initial movement and succeeding step by step movements to the actuating means; means to retain the actuating means in moved position; means to retain the operating means in its initial moved position to prevent step by step movement of the actuating means; and means to render both the retaining means ineffective to feed the record material away from the impression means.

6. In an accounting machine, the combination of means to make impressions on record material; means to feed the record material to the impression means; means to actuate the feeding means; operating means to impart an initial movement and succeeding step by step movements to the actuating means to present the record material to the impression means and to line-space said record material, said operating means including a driving means having a constant excursion of operation; means to arrest the operating means in moved position to prevent step by step movement of the actuating means; and means to render the arresting means ineffective.

7. In a machine of the class described, the combination of means to make impressions on record material; means to feed the record material to and away from the impression means, said feeding means also serving to locate the record material relatively to the impression means; means including a reciprocating element to actuate the feeding means; means including a reciprocating member to operate the actuating means to drive the element; and means to control the operation of the element and the member whereby the record material is advanced to the impression means, and selectively line-spaced, or fed away from the impression means.

8. In a machine of the class described, the combination of means to make impressions on record material; means to feed the record material to and away from the impression means; means to actuate the feeding means; means to operate the actuating means; means to drive the operating means; and means, including a plurality of selecting disks and cooperating feelers, to control the operation of the actuating means and the operating means to cause the feeding means to advance the record material to the impression means, line-space the record material, and feed the record material away from the impression means.

9. In a machine of the class described, the combination of means to make impressions on record material; means to feed the record material to the impression means; means to eject the record material from the feeding means; means to actuate the feeding means; means to operate the actuating means; means to drive the operating means; manipulative means; and means, including a plurality of selecting disks and cooperating feelers controlled by the manipulative means, to control the actuating means and the operating means to cause the feeding means to advance the record material to the impression means, line-space the record material, and present said record material to the ejecting means.

10. In a machine of the class described having means to make impressions on record material and means to eject record material from the machine, the combination of means to feed the record material to and away from the impression means; means to actuate the feeding means; means to operate the actuating means; means to drive the operating means; means to control the operation of the actuating means and the operating means to cause the feeding means to advance the record material to the impression means, line-space the record material and feed said record material away from the impression means; and means effective when the record material is being fed away from the impression means to guide the record material to the ejecting means.

11. In an accounting machine having means to make impressions on record material, and means to eject the record material, the combination of means to feed the record material to and away from the impression means; means to actuate the feeding means; means to operate the actuating means; manipulative means; a plurality of selecting disks controlled by the manipulative means; feeler mechanism controlled by the selecting disks to control the operation of the actuating means and the operating means whereby the feeding means is operated to advance the record material to the impression means, line-space the record material and feed the record material away from the impression means; and means effective when the record material is being fed away from the impression means to guide the record material to the ejecting means.

12. In an accounting machine having means to make impressions upon record material, and means to eject the record material, the combination of means to feed the record material to and away from the impression means; means including a reciprocating member to actuate the feeding means; means including a reciprocating element to operate the member; means to drive the element; means to retain the member in moved position; means to retain the element in moved position; manipulative means; a plurality of disks positioned by the manipulative means; means cooperating with the disks to control the operation of both the retaining means to cause the feeding means in cooperation with the member and the element to advance the record material to the impression means, line-space the record material and feed said record material away from the impression means; and means effective when the record material is being returned to starting position to guide said record material to the ejecting means.

13. In a machine of the class described having a receptacle for record material, and means to make impressions on said record material, the combination of means to eject the record material from the impression means; means to actuate the ejecting means; and means operated by the actuating means to invert the record material and guide said record material into the receptacle.

14. In an accounting machine adapted to make impressions on record material and having a receptacle for the record material, the combination of means to eject the printed record material; and oscillatable means cooperable with the ejecting means to invert the record material and guide it to the receptacle.

15. In a machine of the class described having a receptacle for record material, and means to make impressions on said record material, the combination of means to eject the record material from the impression means; means including an oscillatable member to actuate the ejecting means; and means operated by said member to invert the record material and guide it to the receptacle.

16. In an accounting machine adapted to make imprints on an insertable slip and having a receptacle for the slip, the combination of means to eject the slip; means including an oscillatable member to actuate the ejecting means; means to invert the slip and guide it to the receptacle; and means on the member to control the operation of the inverting means.

17. In an accounting machine adapted to make imprints on an insertable slip and having a receptacle for the slip, the combination of means to eject the slip; an oscillatable member to actuate the ejecting means; means to drive the member; means to invert the slip and guide it to the receptacle; and projections on the member to operate the inverting means.

18. In an accounting machine adapted to make imprints on an insertable slip and having a receptacle for the slip, the combination of means to eject the slip; an oscillatable member to actuate the ejecting means; means including a slotted element to invert the slip and guide it to the receptacle; and means on the member cooperating with the slotted element to operate the inverting means.

19. In a machine of the class described, adapted to make imprints on an insertable slip and having a receptacle for the slip, the combination of means to eject the slip; an oscillatable member to actuate the ejecting means; means including a slotted element to invert the slip and guide it to the receptacle; and projections on the member cooperating with the slotted element to operate the inverting means.

20. In a machine of the class described, adapted to make imprints on an insertable slip, the combination of reversibly operable means to eject the slip; means to actuate the ejecting means; means to drive the actuating means; means connecting the driving means to the actuating means; and means cooperating with the connecting means to control the operation of the actuating means.

21. In a machine of the class described, adapted to print on insertable record material, the combination of means to eject the record material; a member operatively connected to the ejecting means; a main operating means; means connecting the member to the main operating means; and means including, a plurality of selecting disks and associated feeler mechanism, cooperating with the connecting means to control the operation of the ejecting means.

22. In an accounting machine adapted to print on insertable record material, the combination of means to eject the record material; a member operatively connected to the ejecting means; a main operating means; means connecting the member to the main operating means; an element cooperable with the connecting means to control the operation of the ejecting means; and means including a plurality of disks and associated feeler mechanism to control the cooperation between the element and the connecting means.

23. In an accounting machine adapted to print on insertable record material, the combination of means to eject the printed record material; a member operatively connected to the ejecting means; a main operating means including an oscillatable device; means to transmit the movement of the device to the member; an element cooperating with the transmitting means and shiftable to control the operation of the ejecting means; manipulative means; and means including a plurality of disks and associated feeler mechanism controlled by the manipulative means to control the shifting of the element.

24. In an accounting machine adapted to print on insertable record material, the combination of means to eject the printed record material; a main operating means including a shiftable device; means to transmit movement of the shiftable device to the ejecting means; an element cooperating with the transmitting means to prevent the operation of the ejecting means; manipulative means; a plurality of disks controlled by the manipulative means; and feeler mechanism governed by the disks to control the cooperation between the element and the transmitting means.

25. In an accounting machine adapted to print records on insertable slips, the combination of reversibly operable means to eject the printed slips; a main operating device; means to transmit the movement of the main operating device to the ejecting means; resilient means to retain the transmitting means in engagement with the operating device; an element to restrain the transmitting means against the action of the resilient means to block the operation of the ejecting means; manipulative means; and means governed by the manipulative means to control the restraining action of the element.

26. In an accounting machine adapted to print records on insertable record material, the combination of an ejecting device including a roller to eject the printed record material; means to resiliently engage the record material with the roller; power operated means to move the engaging means to and from engaging position; means to operate the ejecting device; means to transmit the movement of the operating means to the ejecting device; means cooperating with the transmitting means to prevent operation of the ejecting device; and means to control the cooperation between the preventing means and the transmitting means.

27. In an accounting machine adapted to print records on insertable slips, the combination of an ejecting device including a plurality of coaxial rollers to eject the printed slip; means to resiliently force the slip against the rollers; a main driving device; means connecting the last mentioned means to the main driving device; means to transmit the movement of the main driving device to the rollers; an element cooperating with the transmitting means to prevent operation of the ejecting device; manipulative means; and means governed by the manipulative means to control the cooperation of the element with the transmitting means.

28. In a machine of the class described, having main operating mechanism and printing means for printing on insertable record material, the combination of a plurality of alined rollers to eject the printed record material; means to feed the record material to the printing means and to return the record material to the ejecting rollers; means including an element operated by the main operating mechanism for operating the feeding means; means to resiliently engage the record material with the ejecting rollers; means connecting the main operating mechanism to the engaging means; means connecting the main operating mechanism to the ejecting rollers; yieldable means to normally maintain the latter connecting means in engagement with the main operating mechanism; means to disengage the latter connecting means from the main operating mechanism; manipulative means; a plurality of disks simultaneously controlled by the manipulative means; and means cooperating with the disks to control the selective operation of the element, and the disengaging means.

29. In a machine of the class described, adapted to print records on insertable record material, the combination of means to eject the printed record material; means to impart a positive movement to the ejecting means; means to impart an impositive movement to the ejecting means; means to restrain the impositive movement of the ejecting means to prevent it from ejecting the record material; manipulative means; a plurality of members controlled by the manipulative means; and means cooperating with the members to control the operation of the restraining means.

30. In a machine of the class described, adapted to print records on insertable record material, the combination of means to eject the printed record material, said means including a gear means to impart a positive movement to the ejecting means; means to impart an impositive movement to the ejecting means; means including a link and a segmental gear which engages the gear in the ejecting means to operatively connect the ejecting means to the positive and impositive moving means; means cooperating with the link to restrain the impositive movement of the ejecting means; manipulative means; a plurality of members controlled by the manipulative means; and means cooperating with the members to control the operation of the restraining means and the link.

31. In an accounting machine having means to print on record material, means to feed the record material toward and away from the printing means, and means to operate the feeding means, the combination of means including a plurality of rollers to eject the record material which is fed away from the printing means and a gear for operating said rollers; means to impart a positive movement to the ejecting means; means to impart an impositive movement to the ejecting means; means including a segmental gear meshing with the gear in the ejecting means to operatively connect the ejecting means to the positive and impositive moving means; means operable during the impositive movement of the ejecting means to press the record material against the rollers; means to restrain the impositive movement of the ejecting means; means to control the operation of the restraining means and the operating means for the feeding means; means to invert the record material during the ejection thereof; and means on the segment gear coacting with the inverting means whereby the inverting means is rendered ineffective near the end of the impositive operation of the gear and is rendered effective during the positive operation of said gear.

32. In a machine of the class described, having means to print on record material, the combination of a plurality of groups of control keys, oscillatable means for feeding record material to and away from said printing means, and means including a plurality of individually controllable pawls controlled by said control keys which pawls selectively cooperate with the feeding means to control the operation of the feeding means whereby the record material is moved in one direction to the printing means, retained in moved position, and selectively moved farther in said one direction to be line-spaced or fed in the opposite direction away from said printing means.

33. In a machine of the class described having printing means, the combination of means to feed record material to the printing means, means to actuate the feeding means and having a shoulder and a plurality of ratchet teeth formed thereon, means for retaining the actuating means in moved positions, means for operating the actuating means including a pawl carried by the operating means cooperable with the shoulder on the actuating means whereby the actuating means operates the feeding means to present the record material to the printing means, said pawl also subsequently cooperable with the ratchet teeth whereby the actuating means operates the feeding means to line-space the record material, and means for controlling the effectiveness of the retaining means.

34. In a machine of the class described, the combination of printing means, means to feed record material to and from the printing means, actuating means for said feeding means, means to operate said actuating means, said actuating means when operated causing the feeding means to advance the record material to said printing means, means to retain said actuating means in operated position, means to retain the operating means in moved position, and means for simultaneously rendering both retaining means ineffective whereby the actuating means, the operating means, and the feeding means are restored to their normal positions causing the record material to be fed from the printing means.

35. In a machine of the class described, having means to make impressions on record material, the combination of reciprocating means to feed said record material to and away from said impression means; means to operate the feeding means and including a plurality of reciprocal members; and means including a plurality of elements selectively cooperable with the members to control the operating means for the feeding means to cause the record material to be advanced in one direction to the impression means, retained in said advanced position, and selectively moved step by step in said one direction to line-space the record material or fed in the opposite direction away from said impression means.

36. In a machine of the class described, the combination of means to make impressions on record material; reversibly operable means to feed the record material to and away from impression position; means including a reciprocating element to actuate the feeding means; means including a reciprocating member to operate the actuating means to drive the element; and means to control the operation of the element and the member whereby the record material is advanced to an initial impression position and selectively line spaced or fed away from the impression means.

37. In an accounting machine, the combination of means to print on record material; means to feed record material to and away from printing position including a reversibly operable element to engage the record material to move it in both directions; means to actuate the feeding means in both directions; means having a uniform movement and operable to drive the actuating means various extents whereby the record material feed means can be actuated to feed various portions of the record material to printing position; means to operate the actuating means whereby the record material feeding means can feed the record material away from printing position; and means to selectively control the operation of the actuating means by the several operating means.

38. In a machine of the class described, means to eject record material from the machine, means to operate the ejecting means, and guiding means controlled by the operating means to invert the record material during the movement of the record material by the ejecting means.

39. In a machine of the class described, adapted to print on insertable record material, the combination of a reversely operable means to eject the printed record material; means to impart a positive movement to the ejecting means in one direction; means to impart impositive movement to the ejecting means in another direction to eject the record material; means movable to engage the record material with the ejecting means during the impositive movement of the ejecting means; means to restrain the impositive movement of the ejecting means to prevent it from ejecting the record material; manipulative means; a plurality of members controlled by the manipulative means; and means cooperating with the members to control the operation of the restraining means.

40. In a machine of the class described having printing mechanism and means to feed record material to the printing mechanism and away from the printing mechanism, the combination of means to eject the record material which is fed away from the printing mechanism; means to operate the ejecting means; means including a segmental gear and a link to transmit the movement of the operating means to the ejecting means; an element cooperating with the link to prevent the operation of the ejecting means; and means to control the cooperation of the element and the link.

41. In a machine of the class described having printing mechanism and means to feed record material toward and away from the printing mechanism, the combination of means to eject record material which is fed away from the printing mechanism; means to operate the ejecting means; means including a segmental gear and a link to transmit the movement of the operating means to the ejecting means; a projection on the link; an element engageable with the projection to prevent the operation of the ejecting means; and means including a plurality of disks and associated feeler mechanism to control the engagement of the element with the projection.

42. In an accounting machine having means to print on record material, means to feed said record material toward and away from the printing means, and means to actuate said feeding means, the combination of means including a plurality of rollers to eject the record material which is fed away from the printing means; means to impart a positive movement to the ejecting means; means to impart an impositive movement to the ejecting means; means to operatively connect the ejecting means to the positive and impositive moving means; means operable during the impositive movement of the ejecting means to press the record material against the rollers; means cooperating with the connecting means to prevent the impositive movement of the ejecting means; manipulative means; a plurality of members controlled by the manipulative means; and means controlled by the members to control the operation of the printing means, the feeding means, and the preventing means to thereby coordinate the operation of the ejecting means with the operation of the feeding and printing means.

43. In an accounting machine having a receptacle for receiving record material, means to make imprints on said record material, and means to feed record material toward and away from said printing means, the combination of means including a plurality of rollers to eject the record material which is fed away from the printing means and a gear for operating said rollers; means to impart a positive movement to the ejecting means; means to impart an impositive movement to the ejecting means; means including a segmental gear meshing with the gear in the ejecting means and a link to connect the ejecting means to the positive and impositive moving means; means operable during the impositive movement of the ejecting means, to press the record material against the ejecting rollers; an element cooperating with the connecting means to restrain the impositive movement of the ejecting means; manipulative means; a plurality of members controlled by the manipulative means; means controlled by the members for controlling the cooperation between the element and the connecting means and also for controlling the operation of the printing means and feeding means to coordinate the operation of the ejecting means and the printing and feeding means; means including a slotted member to invert the record material during ejection thereof and to guide the same to the receptacle; and projections on the segmental gear cooperating with the slotted member to operate the inverting means.

CHARLES H. ARNOLD.